United States Patent
Eno

(10) Patent No.: US 10,583,353 B2
(45) Date of Patent: Mar. 10, 2020

(54) COMMUNICATION SYSTEM WITH ONLINE GAME BASED UPON ATHLETIC ACTIVITY AND RELATED METHODS

(71) Applicant: Maximum Amusements, Inc., Ocala, FL (US)

(72) Inventor: James Eno, Ocala, FL (US)

(73) Assignee: MAXIMUM AMUSEMENTS, INC., Dunellon, FL (US)

(*) Notice: Subject to any disclaimer, the term of this patent is extended or adjusted under 35 U.S.C. 154(b) by 0 days.

(21) Appl. No.: 15/907,824

(22) Filed: Feb. 28, 2018

(65) Prior Publication Data
US 2018/0280791 A1 Oct. 4, 2018

Related U.S. Application Data

(60) Provisional application No. 62/464,549, filed on Feb. 28, 2017.

(51) Int. Cl.
| | |
|---|---|
| *A63F 13/35* | (2014.01) |
| *A63F 13/212* | (2014.01) |
| *A63F 1/04* | (2006.01) |
| *G07F 17/32* | (2006.01) |
| *A63F 13/69* | (2014.01) |

(52) U.S. Cl.
CPC .............. *A63F 13/212* (2014.09); *A63F 1/04* (2013.01); *G07F 17/326* (2013.01); *G07F 17/3293* (2013.01); *A63F 13/35* (2014.09); *A63F 13/69* (2014.09)

(58) Field of Classification Search
CPC .. G07F 17/326; G07F 17/3293; A63F 13/212; A63F 13/35; A63F 13/69
USPC .......................................................... 463/7
See application file for complete search history.

(56) References Cited

U.S. PATENT DOCUMENTS

| | | | |
|---|---|---|---|
| 6,585,622 B1* | 7/2003 | Shum | A61B 5/0004 482/8 |
| 8,353,770 B2* | 1/2013 | Lu | A61B 5/1112 463/39 |
| 2005/0164857 A1* | 7/2005 | Black | A45C 11/18 482/148 |

(Continued)

OTHER PUBLICATIONS

"Higi's Story" https://higi.com/about; Dec. 9, 2016; pp. 6.
(Continued)

*Primary Examiner* — Omkar A Deodhar
*Assistant Examiner* — Shauna-Kay Hall
(74) *Attorney, Agent, or Firm* — Allen, Dyer, Doppelt + Gilchrist, PA

(57) ABSTRACT

A communication system may include a server having a memory and processor, mobile wireless communications devices in communication with the server, a given mobile wireless communications device, and a given activity tracker device carried by a respective user of the given mobile wireless communications device. The given mobile wireless communications device may be configured to execute an online card game with other mobile wireless communications devices via the server, wirelessly communicate with the given activity tracker device for monitoring an athletic activity of the respective user of the given mobile wireless communications device, and communicate with the server and cause the online card game to deal a card when the respective user exceeds an athletic activity threshold.

16 Claims, 18 Drawing Sheets

(56) References Cited

U.S. PATENT DOCUMENTS

| | | | |
|---|---|---|---|
| 2008/0077489 A1 | 3/2008 | Gilley et al. | |
| 2009/0305772 A1* | 12/2009 | Melendez | A63F 9/00 463/23 |
| 2011/0136627 A1 | 6/2011 | Williams | |
| 2011/0197157 A1 | 8/2011 | Hoffman et al. | |
| 2012/0041767 A1* | 2/2012 | Hoffman | G06Q 10/00 705/1.1 |
| 2013/0137497 A1* | 5/2013 | Werkstell | A63F 1/00 463/13 |
| 2014/0370975 A1* | 12/2014 | Coronel | A63F 13/69 463/25 |

OTHER PUBLICATIONS

"Get paid to be healthy" https://www.achievemint.com/; Dec. 9, 2016; pp. 3.

"Wellcoin's mission is to help the world get healthier by increasing the frequency and diversity of helthy activites in our daily lives" ttps://www.wellcoin.com/About; Dec. 9, 2016 pp. 4.

"Wellcoin—World's First Health Currency—Wellcoin, Fitbit and the Automatic Verification of Healthy Activities" http://wellcoin.tumblr.com/post/50579275579/wellcoin-fitbit-and-the-automatic-verification-of; Dec. 6, 2016; pp. 3.

"How to Make Money on Your FitBit (Or Other Activity Tracker)" http://www.pennypinchinmom.com/make-money-fit-bit-activity-tracker/; Dec. 9, 2016; pp. 9.

\* cited by examiner

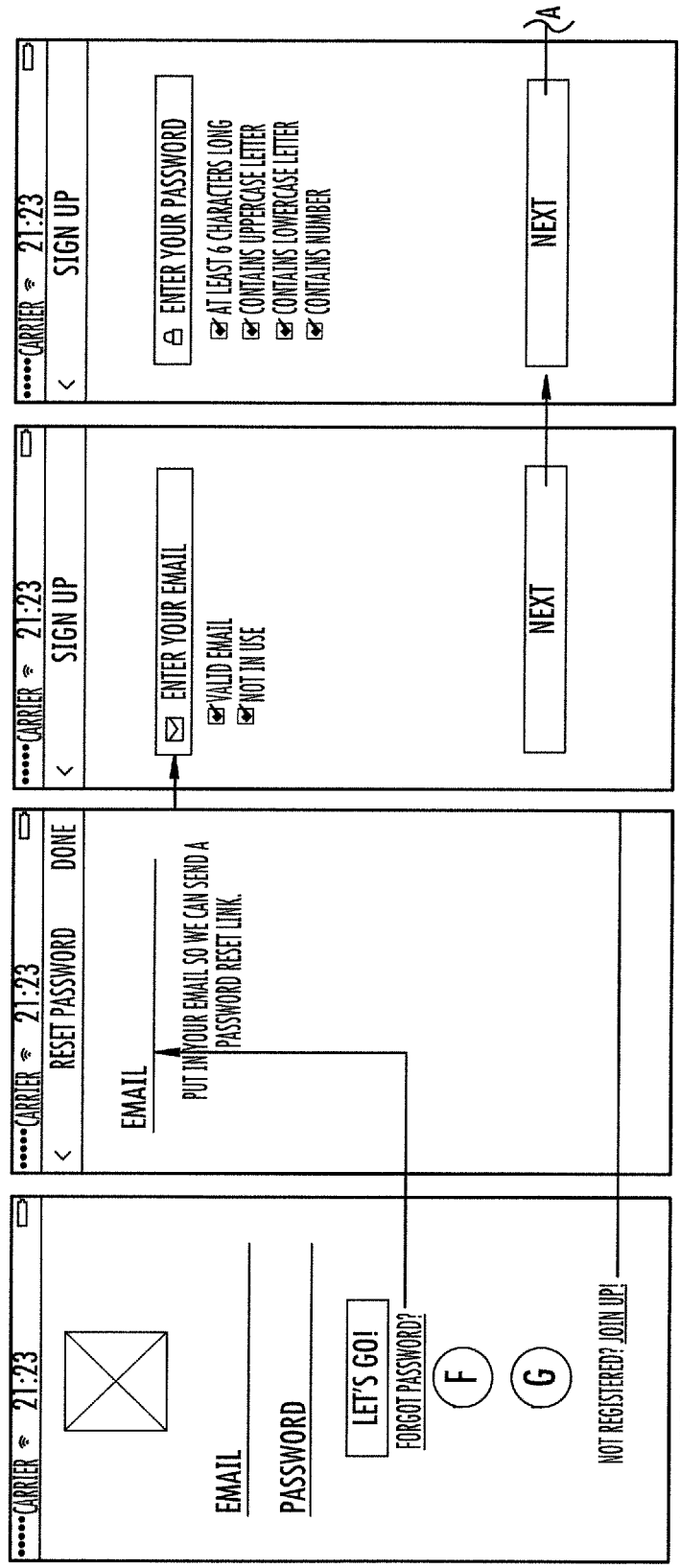

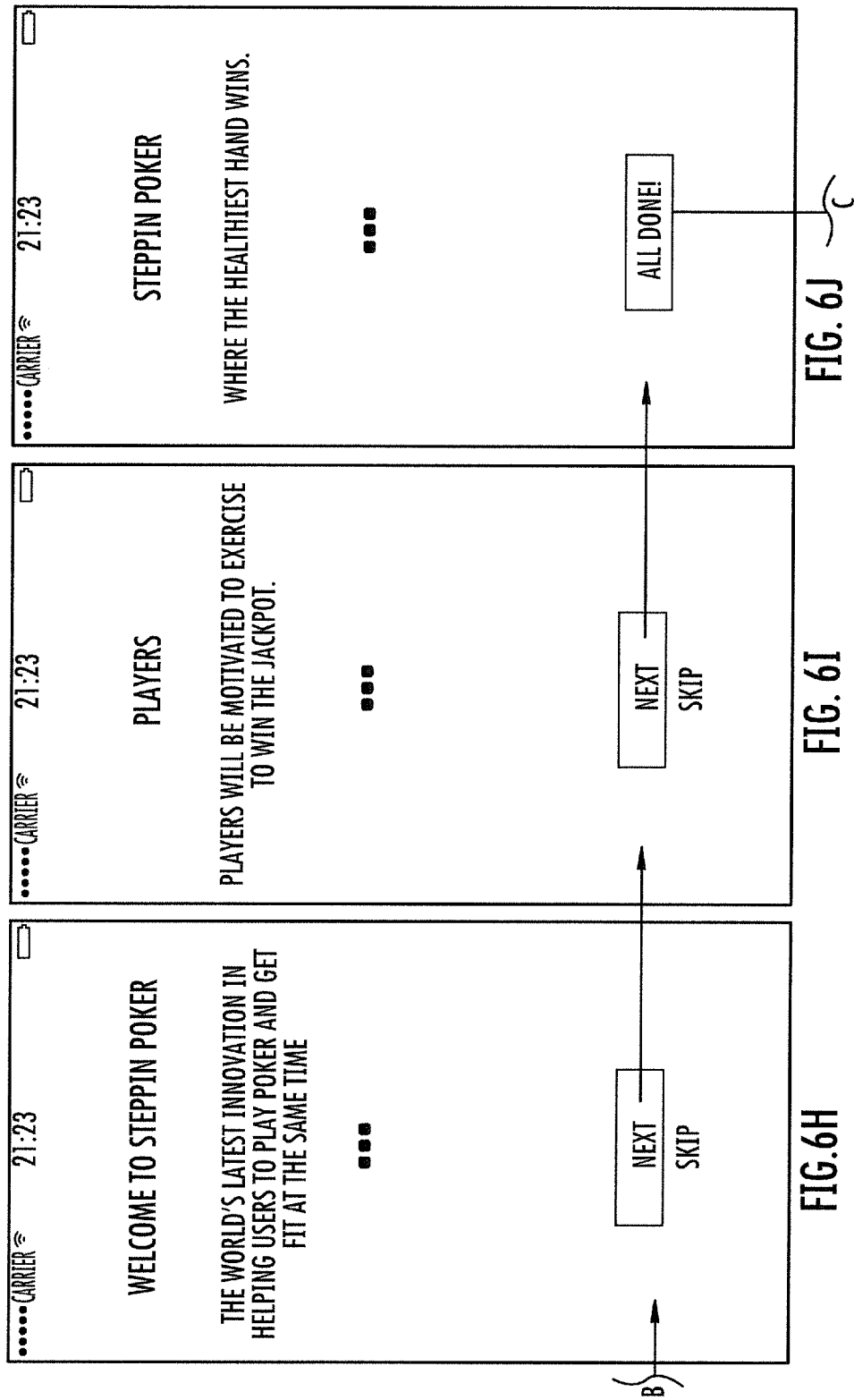

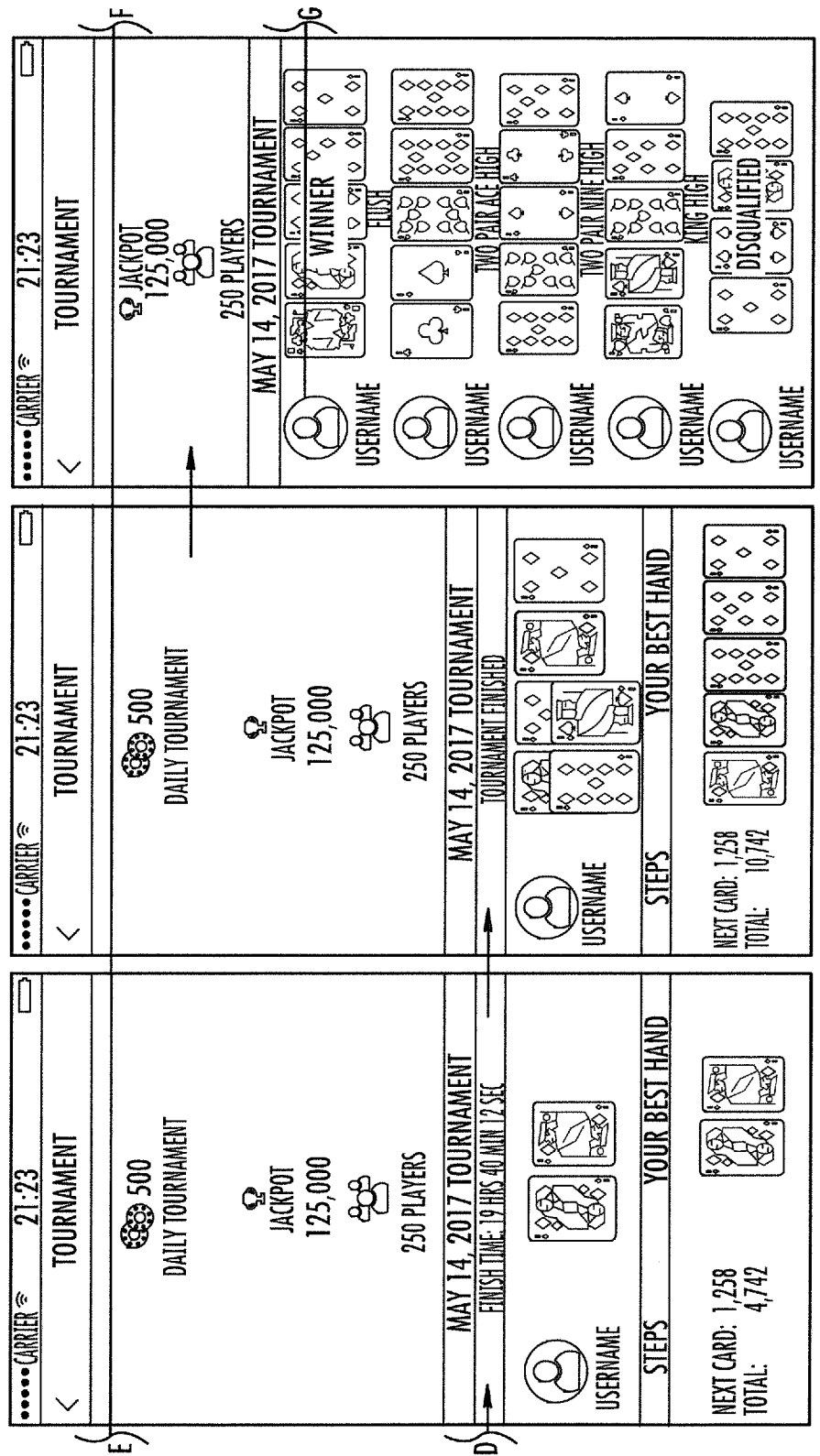

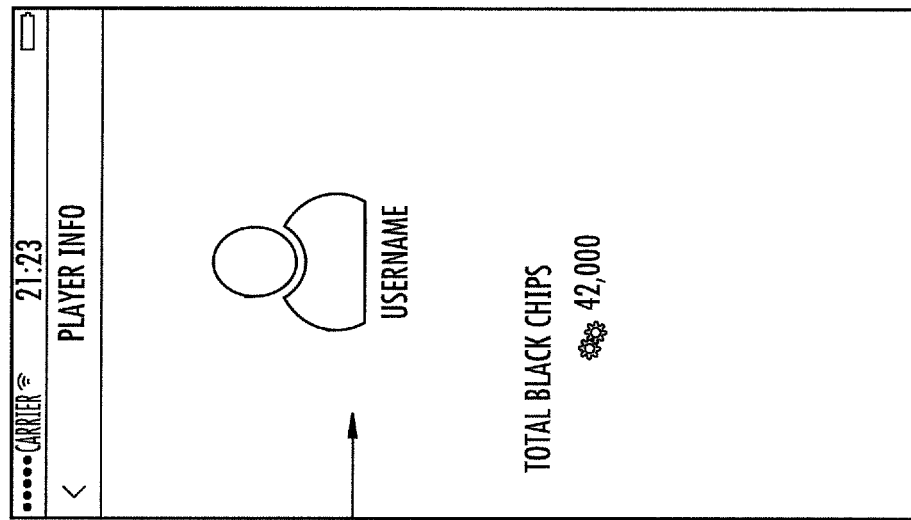
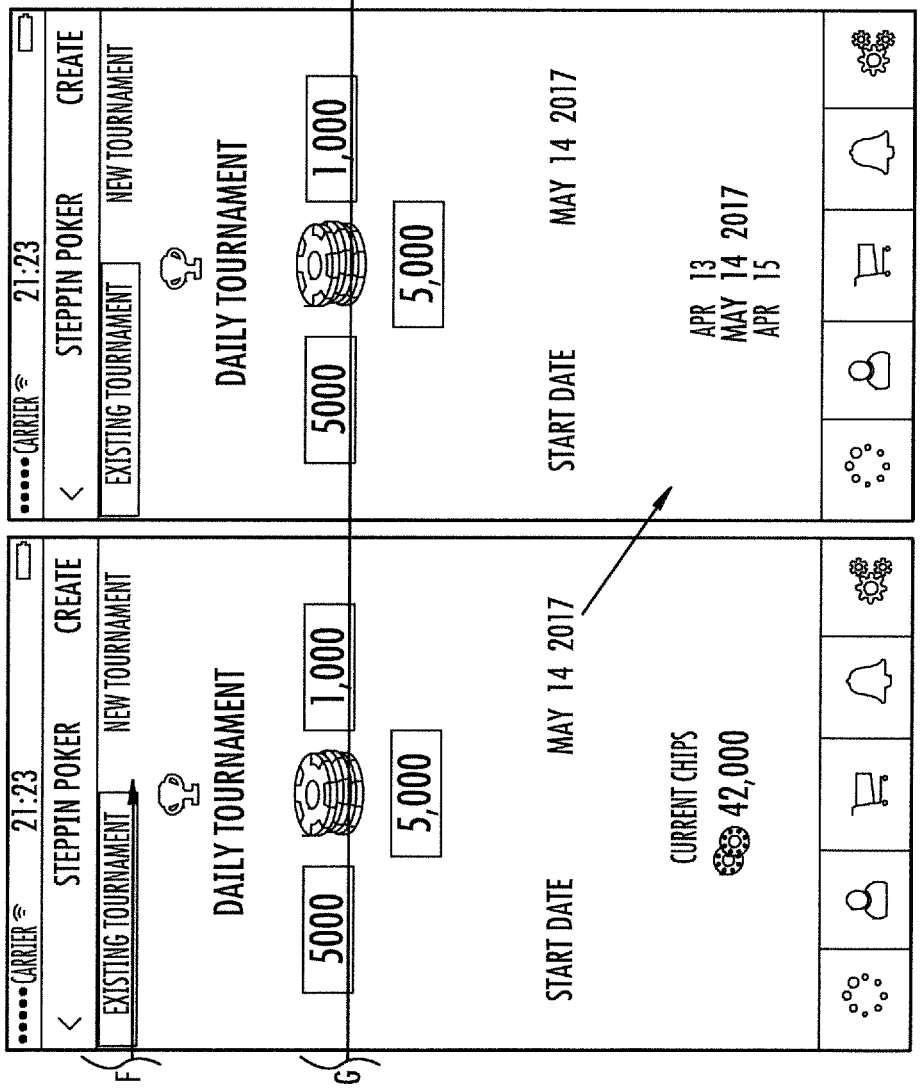
FIG. 6R  FIG. 6S  FIG. 6T

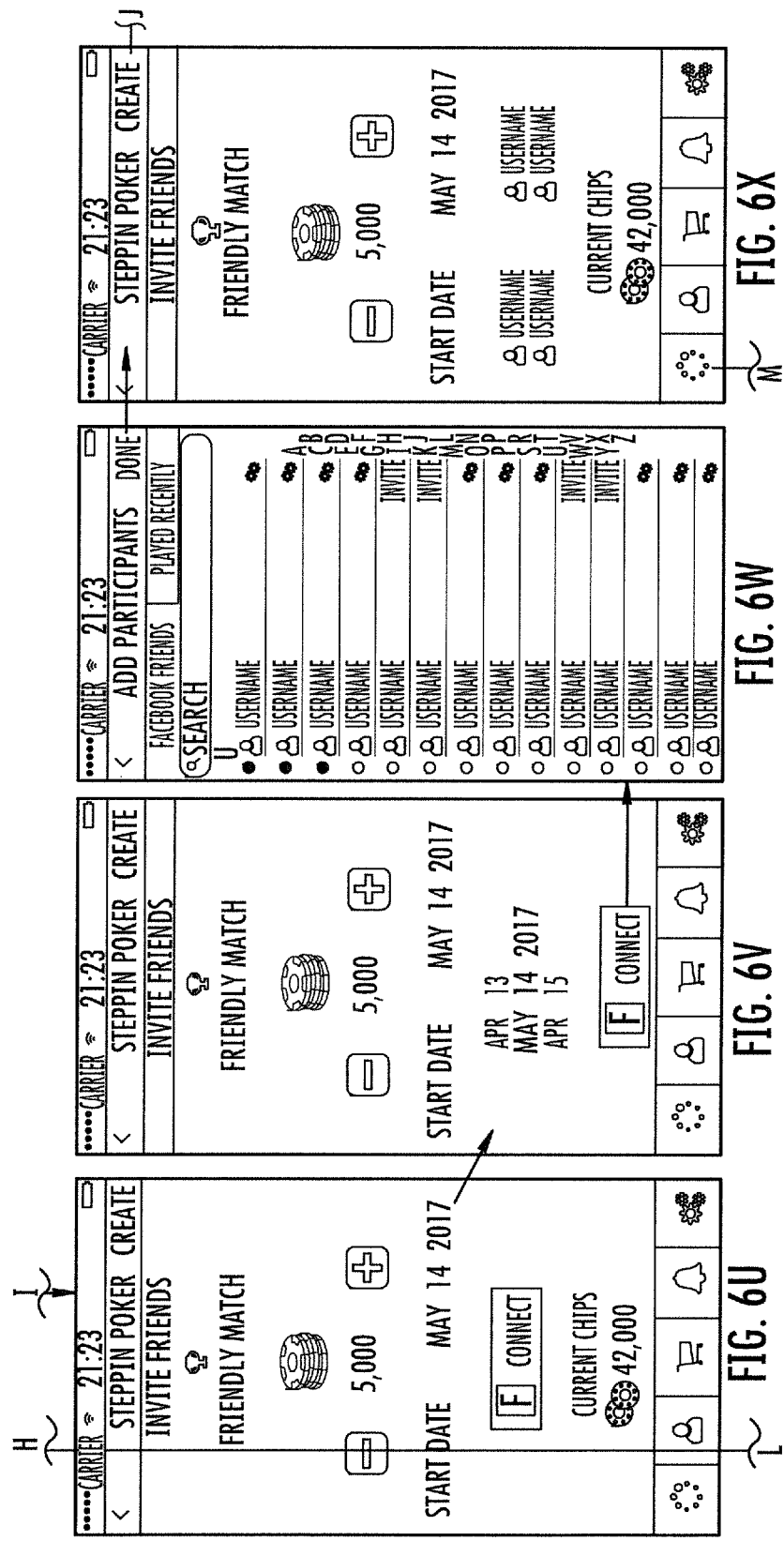

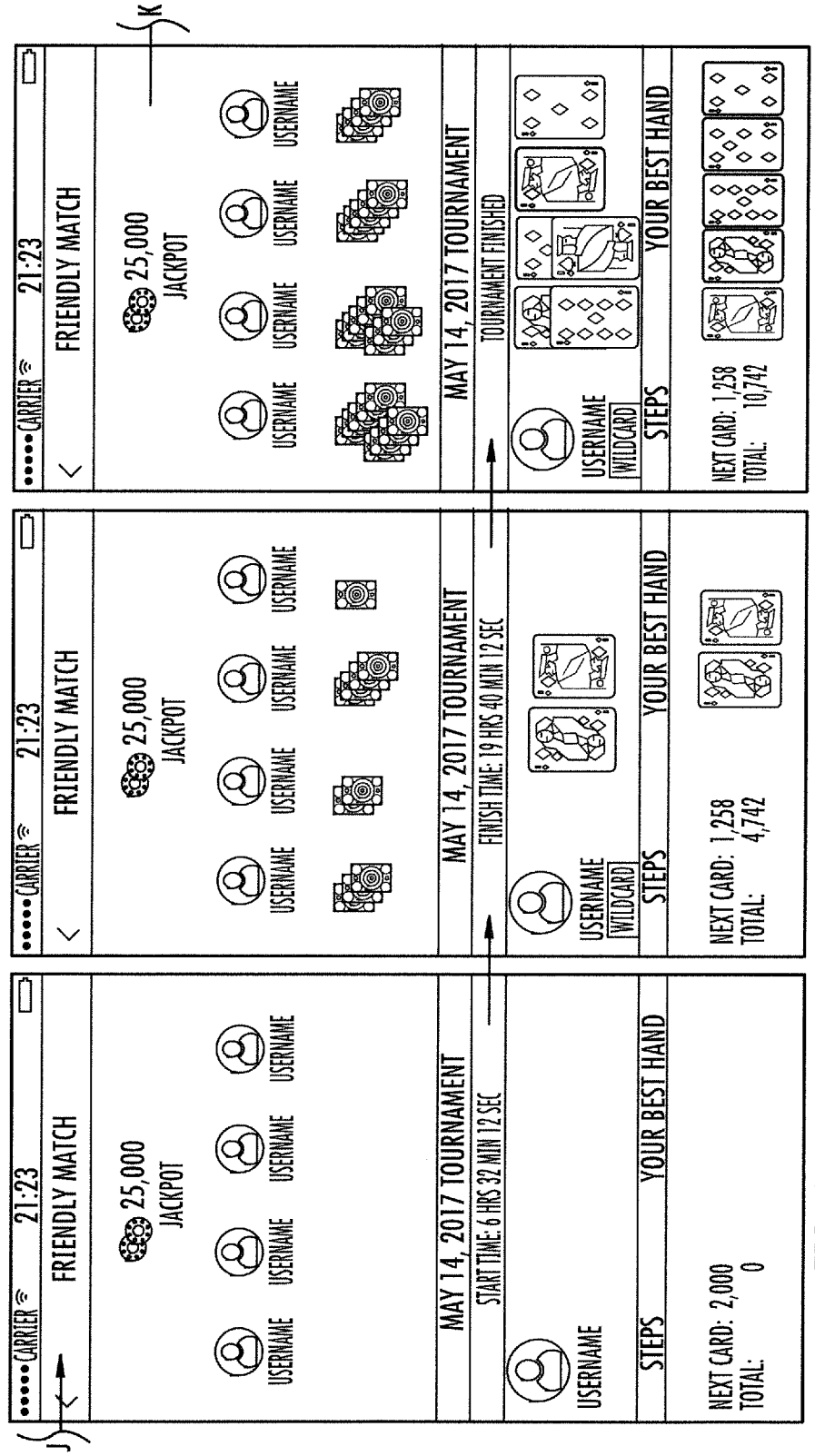

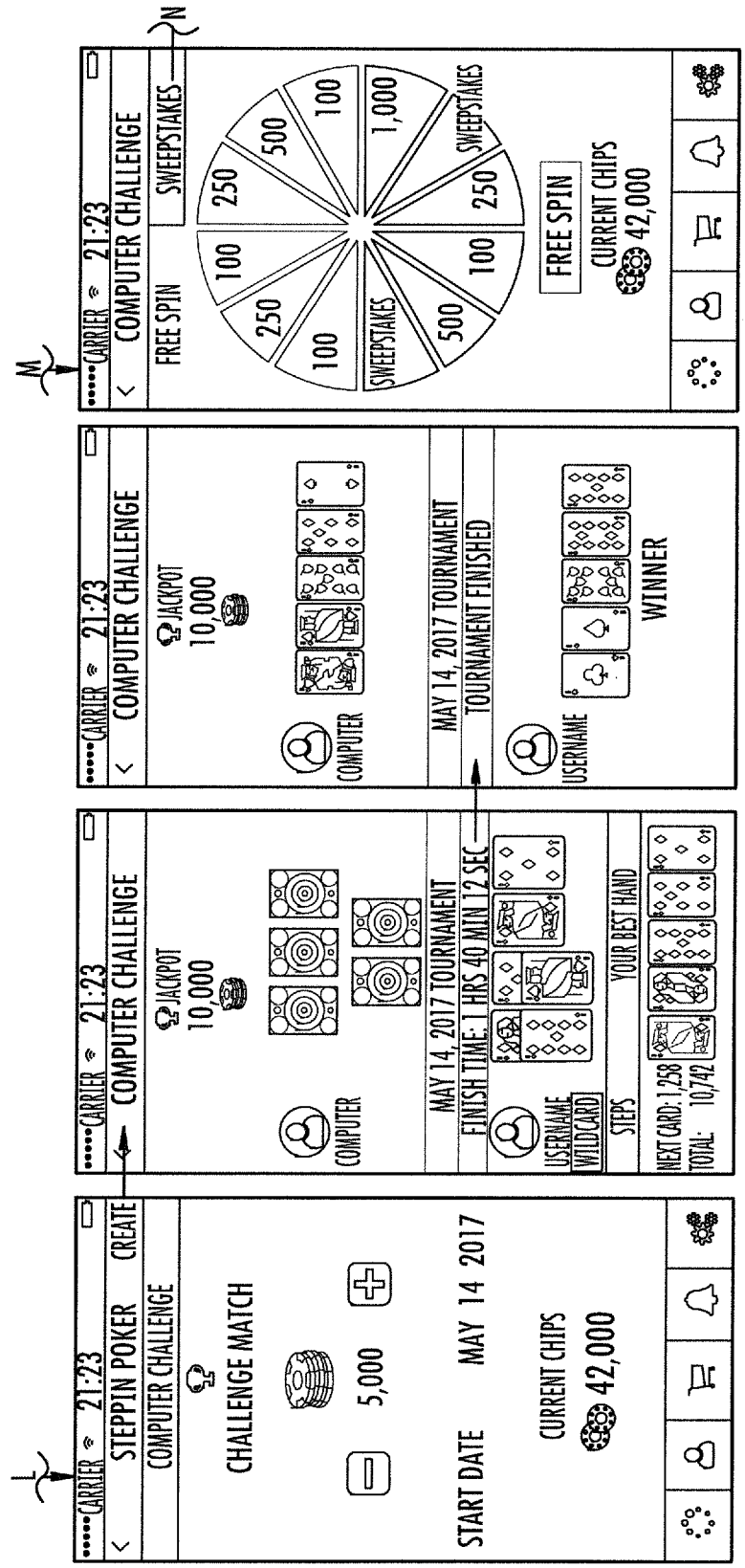

COMMUNICATION SYSTEM WITH ONLINE GAME BASED UPON ATHLETIC ACTIVITY AND RELATED METHODS

RELATED APPLICATION

This application is based upon prior filed Application No. 62/464,549 filed Feb. 28, 2017, the entire subject matter of which is incorporated herein by reference in its entirety.

TECHNICAL FIELD

The present disclosure relates to the field of games, and, more particularly, to online mobile games and related methods.

BACKGROUND

Cellular communications systems continue to grow in popularity and have become an integral part of both personal and business communications. Cellular telephones allow users to place and receive voice calls most anywhere they travel. Moreover, as cellular telephone technology has increased, so too has the functionality of cellular devices and the different types of devices available to users. For example, many cellular devices now incorporate personal digital assistant (PDA) features such as calendars, address books, task lists, etc. Moreover, such multi-function or "smart devices may also allow users to wirelessly send and receive electronic mail (email) messages and access the Internet via a cellular network and/or a wireless local area network (WLAN), for example.

Mobile devices such as smartphones are also capable of running relatively sophisticated applications, such as games, document processing applications, chat or instant messaging applications, etc. One popular application type is the gaming application. As mobile devices started including advanced onboard graphical processing units, gaming applications became more advanced and even included three-dimensional rendering. Nevertheless, one of the most popular genres of gaming applications is card games, such as poker, solitaire, etc.

Another popular application type is the personal fitness application. Typically, since most mobile devices now include gyroscopes and accelerometers, the personal fitness application can approximate steps and other exercise motions of the user, and aggregate the data for sharing with friends in online competitions. In other words, the personal fitness application provides for the gamification of exercise.

SUMMARY

Generally, a communication system may include a server comprising a memory and processor coupled therewith, and a plurality of mobile wireless communications devices in communication with the server. Each mobile wireless communications device may include a memory and processor coupled therewith. The communication system may include a given mobile wireless communications device from the plurality thereof, and a given activity tracker device carried by a respective user of the given mobile wireless communications device. The given mobile wireless communications device may be configured to execute an online card game with other mobile wireless communications devices via the server, wirelessly communicate with the given activity tracker device for monitoring an athletic activity of the respective user of the given mobile wireless communications device, and communicate with the server and cause the online card game to deal at least one card when the respective user exceeds at least one athletic activity threshold.

In some embodiments, the given activity tracker device may comprise a wearable wireless fitness tracker device separate from the given mobile wireless communications device. The athletic activity of the respective user may include at least one of a value of steps, a value of stair steps, a linear distance value, for example.

In other embodiments, the given mobile wireless communications device may include a housing, a processor carried by the housing, and a memory coupled to the processor and also carried by the housing. Further, the given activity tracker device may comprise an integrated activity tracker device carried by the housing.

The given mobile wireless communications device may be configured to communicate with the server and cause the online card game to deal a plurality of sequential cards when the respective user exceeds a corresponding plurality of athletic activity thresholds. More specifically, the online card game may include a minimum number of cards, and the server may be configured, when the respective user has been dealt a number of cards greater than or equal to the minimum number of cards and when the respective user exceeds a subsequent athletic activity threshold, to deal a new card and permit the respective user to replace an existing card with the new card in the online card game.

In particular, the online card game may have a minimum number of cards, and the server may be configured to operate the online card game to have a time limit. The server may be configured, when the time limit has expired and when the respective user has been dealt a number of cards less than the minimum number of cards, to end the online card game for the respective user. Also, the server may be configured, when the time limit has expired and when the respective user has been dealt a number of cards greater than or equal to the minimum number of cards, to complete the online card game for the respective user with previously dealt cards. For example, the online card game comprises a poker card game, such as 5-card draw poker, joker poker, high score poker, 1-deck draw poker, 1-deck poker unlimited, and poker unlimited.

Another aspect is directed to a method of operating an online card game within a communication system comprising a server, a plurality of mobile wireless communications devices in communication with the server, a given mobile wireless communications device from the plurality thereof, and a given activity tracker device carried by a respective user of the given mobile wireless communications device. The method may include operating the server and given mobile wireless communications device to execute an online card game with other mobile wireless communications devices, and operating the given mobile wireless communications device to wirelessly communicate with the given activity tracker device for monitoring an athletic activity of the respective user of the given mobile wireless communications device. The method may further include operating the server and given mobile wireless communications device to cause the online card game to deal at least one card when the respective user exceeds at least one athletic activity threshold.

DETAILED DESCRIPTION

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and prime notation is used to indicate similar elements in alternative embodiments.

The invention is directed to an online card game (e.g. 5-card draw poker, Texas Hold'em) conducted among a plurality of players using corresponding wireless devices (e.g. cellular phones, smart watches). In particular, each of the players accumulates physical activity points from the onboard activity trackers (e.g. pedometer, multi-axis gyroscope) of the wireless device. The players compete in the card game and receive a first set of cards after hitting a threshold activity level.

Figure 1:
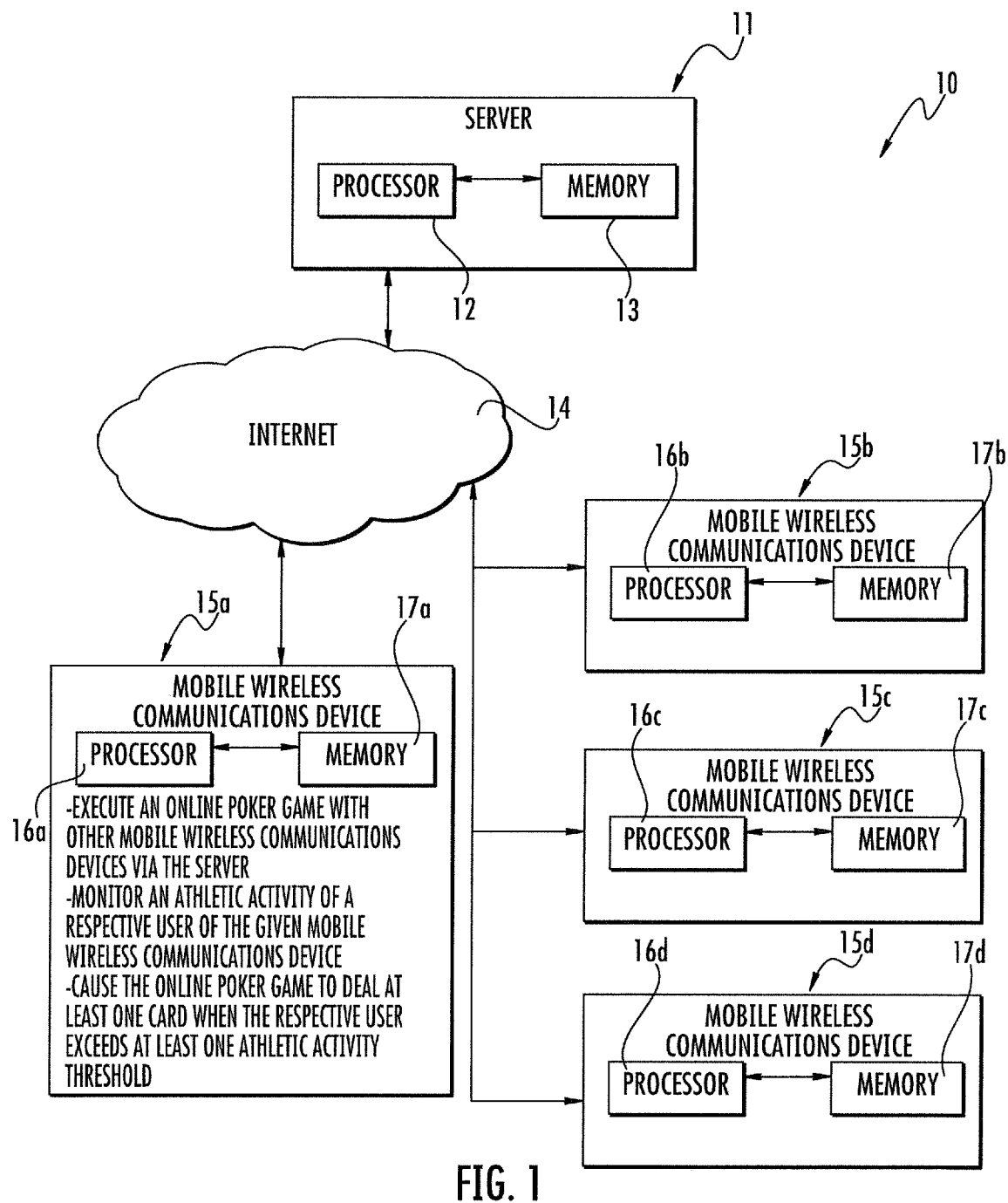
FIG. 1 is a schematic diagram of a communication system, according to the present disclosure.

Referring initially to FIG. 1, a communication system 10 according to the present disclosure is now described. The communication system 10 illustratively includes a server 11 comprising a memory 13 and processor 12 coupled therewith, and a plurality of mobile wireless communications devices (e.g. cell phone devices, tablet computing devices, etc.) 15a-15d in communication with the server via a network (e.g. the illustrated Internet) 14. Each mobile wireless communications device 15a-15d illustratively includes a memory 17a-17d and processor 16a-16d coupled therewith.

A given mobile wireless communications device 15a from the plurality of mobile wireless communications devices 15a-15d is configured to cooperate with the server 11 for executing an online multi-player game (for play by a respective user) with other mobile wireless communications devices (and their corresponding users) via the server 11. In other embodiments, the server 11 may be omitted, and the local devices could operate using a mesh network/crowd sourced approach to sharing the backend of the online multi-player game.

In several of the embodiments illustrated, the online multi-player game comprises an online poker game. As will be appreciated, the online poker game can comprise a digital version of any variant of the traditional card game of poker, such as, 5-card draw poker, Texas Hold'em, for example. In some embodiments, the online multi-player game may alternatively comprise a generic card game, or another online digital game with incremental sequential steps in gameplay.

The given mobile wireless communications device 15a is configured to monitor an athletic activity of a respective user of the given mobile wireless communications device. The given mobile wireless communications device 15a may comprise one or more of a multi-axis gyroscope, an accelerometer, an altitude detection device, a global positioning system (GPS antenna, a heartrate monitor, and a pedometer. The given mobile wireless communications device 15a is configured to use these onboard devices to measure the athletic activity of the respective user. The measured athletic activity may comprise one or more of steps, miles, linear measurement of altitude displacement, floors climbed, elapsed time period with increased heartrate, etc.

The given mobile wireless communications device 15a is configured to operate the online poker game to award a plurality of physical activity points for a set measured athletic activity. For example, the user may receive 1-point for each step/floor measured, but other exchange rates could be used. The given mobile wireless communications device 15a is configured to cause the online poker game to deal at least one card when the respective user exceeds at least one athletic activity threshold. In other words, the progress of the cards being dealt is controlled by the user accumulating athletic activity.

In one exemplary embodiment, the online poker game comprises 5-card draw poker, and the user would receive five cards upon hitting 10,000 steps (e.g., in a one-to-one exchange for steps and points, accumulating 10,000 physical activity points). After passing a first athletic activity threshold (here 10,000 physical activity points), the user can receive additional cards to enhance chances of winning the card game with additional activity, thereby passing additional athletic activity thresholds. For example, for each additional 1,000 physical activity points accumulated by the user, the given mobile wireless communications device 15a is configured to cause the online poker game to deal an additional card, permitting the user to improve the quality of the user's poker hand.

The online poker game would include a set time period for completion of a hand of poker. Once the set time period has expired, the activity tracking ends, and the users compete in the online card game with the drawn cards. Given the inherent chance element of the online poker game, accumulating more activity may improve your chances of winning, but it does not guarantee a winning hand, thereby allowing users with less accumulated activity to win the online card game in some circumstances. Advantageously, this permits users with lesser physical activity points to have a chance at beating other users with a greater amount of physical activity points, which improves user engagement in athletic activities. This is in contrast to typical competitions within personal fitness applications where a physical activity leader may possess an insurmountable lead, causing trailing players to disengage from the online competition.

an exemplary embodiment of the online poker game is now described. The online poker game provides an initial splash screen for "stepping poker", a registration portal for creating a gamer profile (e.g. username, password, email, and user physical characteristics, such as user weight and height) on the server 11, and an interface for inviting friends to the online poker game (e.g. by polling the onboard stored contacts or the stored contacts on cloud service providers, such as Microsoft Exchange, Google).

The online poker game provides a menu of icons for selecting a current game from a plurality of online poker games, each game operating based upon athletic activity as noted herein. The potential game selections comprise 5-card draw poker, joker poker, high score poker, 1-deck draw poker, 1-deck poker unlimited, and poker unlimited. The game selection interface also includes a button for accessing a bank database, discussed herein.

Also, once the user selects or long-presses a game icon, the online poker game would proceed to a rules screen, providing the detailed rules for the selected online poker game. The user selects the duration (i.e. the aforementioned set time period) of the online poker game. In other words, the user would have to accumulate the needed physical activity points to complete a hand of poker before the end of the selected time period. The user selects the amount for the wager for the online poker game. As discussed herein, the disclosed online poker game includes a plurality of gaming chip types.

In the illustrated example, the user selects 5-card draw poker, and the games progresses. The game interface includes a plurality of indicators, such as a remaining time period indicator, a current hand indicator, a jackpot amount indicator, an athletic activity points indicator, and indicators for the current hand of other users. With the completion of the game, in the illustrated embodiment, the hand of poker, the user is provided with an interface to summarize winnings, and an interface with a button to play the same game again, which transitions to the next step, which permits the user to select other users to play another online poker game. Of course, in other embodiments, the game could include more than one hand of poker. In the next illustrated example, the user selects poker unlimited as the current game, and the games progresses.

As part of the gamer profile stored at the server 11, the server is also configured to maintain a database for stored gaming chips (i.e. a bank database) within the online poker game. The interface for the user to access the bank database is shown. In the interface, the user can add or buy more gaming chips (e.g. providing a credit card interface or another payment provider interface, such as PayPal, Apple Pay, or Google Pay), withdraw the gaming chips (e.g. using the same payment provider interface), or gift gaming chips to another user.

Also, the bank database maintains data for a plurality of gaming chip types. In the illustrated embodiment, the types of gaming chips include gold, i.e. redeemable, and black, i.e. non-redeemable. Depending on the local jurisdiction, the gold gaming chips may be redeemable for local currency, or credits for purchase of products. In some embodiments, the bank database may only monitor a single type of gaming chip that is non-redeemable.

Of course, since the black gaming chips are non-redeemable, there is no withdraw option. In other words, the black gaming chips have value only within the online poker game. Nevertheless, the black gaming chips can be purchased and transferred similarly to the gold gaming chips.

The online poker game includes an interface for using the gaming chips to purchase items on affiliate websites or to donate the gaming chips to affiliate charities.

Another aspect is directed to a method for operating the given mobile wireless communications device 15a to execute the herein disclosed online poker game. Yet another aspect is directed to a method for operating the herein disclosed communication system 10 to execute the herein disclosed online poker game.

Example components that may be used in the mobile wireless communications device 15a-15d of FIG. 1 are further described below with reference to FIGS. 2-5.

Examples of applicable communication devices include pagers, cellular phones, cellular smart-phones, wireless organizers, personal digital assistants, computers, laptops, tablet computing devices, smart watches, handheld wireless communication devices, wirelessly enabled notebook computers and the like.

The mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities). To aid the reader in understanding the structure of the mobile device and how it communicates with other devices and host systems, reference will now be made to FIGS. 2-5.

Figure 2:
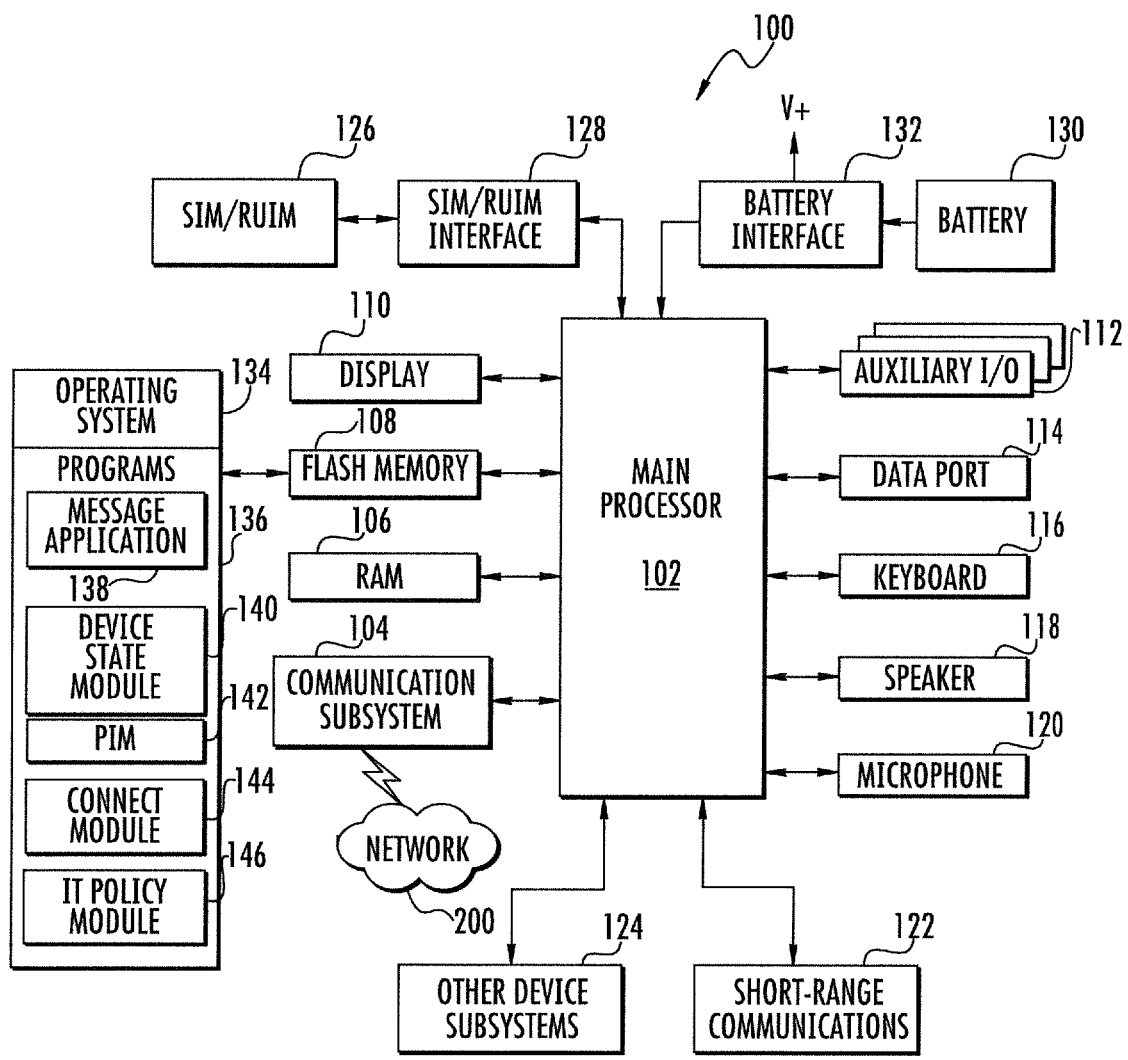
FIG. 2 is a block diagram of an example embodiment of a mobile device that may be used with the communication system of FIG. 1.

Referring first to FIG. 2, shown therein is a block diagram of an example embodiment of a mobile device 100. The mobile device 100 includes a number of components such as a main processor 102 that controls the overall operation of the mobile device 100. Communication functions, including data and voice communications, are performed through a communication subsystem 104. The communication subsystem 104 receives messages from and sends messages to a wireless network 200. In this example embodiment of the mobile device 100, the communication subsystem 104 is configured in accordance with the Global System for Mobile Communication (GSM) and General Packet Radio Services (CPRS) standards. The GSM/CPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the example embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with mobile device 100 is a GSM/GPRS wireless network in one example implementation, other wireless networks may also be associated with the mobile device 100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122 and other device subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The mobile device 100 can send and receive communication signals over the wireless network 200 after required network registration or activation procedures have been completed. Network access is associated with a subscriber or user of the mobile device 100. To identify a subscriber, the mobile device 100 requires a SIM/RUIM card 126 (i.e., Subscriber Identity Module or a Removable User Identity Module) to be inserted into a SIM/RUIM interface 128 in order to communicate with a network. The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIM/RUIM interface 128, a subscriber can access all subscribed services. Services may include: web browsing and messaging such as email, voice mail, Short Message Service (SMS), and Multimedia Messaging Services (MMS). More advanced services may include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 can include some user parameters such as an International Mobile Subscriber Identity (IMSI). An advantage of using the SIM card/RUIM 126 is that a subscriber is not necessarily bound by any single physical mobile device. The SIM card/RUIM 126 may store additional subscriber information for a mobile device as well, including date book (or calendar) information and recent call information. Alternatively, user identification information can also be programmed into the flash memory 108.

The mobile device 100 is a battery-powered device and includes a battery interface 132 for receiving one or more rechargeable batteries 130. In at least some example embodiments, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100.

The mobile device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, will normally be installed on the mobile device 100 during its manufacture. Other software applications include a message application 138 that can be any suitable software program that allows a user of the mobile device 100 to send and receive electronic messages. Various alternatives exist for the message application 138 as is well known to those skilled in the art. Messages that have been sent or received by the user are typically stored in the flash memory 108 of the mobile device 100 or some other suitable storage element in the mobile device 100. In at least some example embodiments, some of the sent and received messages may be stored remotely from the device 100 such as in a data store of an associated host system that the mobile device 100 communicates with.

The software applications can further include a device state module 140, a Personal Information Manager (PIM) 142, and other suitable modules (not shown). The device state module 140 provides persistence, i.e., the device state module 140 ensures that important device data is stored in persistent memory, such as the flash memory 108, so that the data is not lost when the mobile device 100 is turned off or loses power.

The PIM 142 includes functionality for organizing and managing data items of interest to the user, such as, but not limited to, email, contacts, calendar events, voice mails, appointments, and task items. A PIM application has the ability to send and receive data items via the wireless network 200. PIM data items may be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

The mobile device 100 also includes a connect module 144, and an IT policy module 146. The connect module 144 implements the communication protocols that are required for the mobile device 100 to communicate with the wireless infrastructure and any host system, such as an enterprise system, that the mobile device 100 is authorized to interface with. Examples of a wireless infrastructure and an enterprise system are given in FIGS. 4 and 5, which are described in more detail below.

The connect module 144 includes a set of APIs that can be integrated with the mobile device 100 to allow the mobile device 100 to use any number of services associated with the enterprise system. The connect module 144 allows the mobile device 100 to establish an end-to-end secure, authenticated communication pipe with the host system. A subset of applications for which access is provided by the connect module 144 can be used to pass IT policy commands from the host system to the mobile device 100. This can be done in a wireless or wired manner. These instructions can then be passed to the IT policy module 146 to modify the configuration of the device 100. Alternatively, in some cases, the IT policy update can also be done over a wired connection.

The IT policy module 146 receives IT policy data that encodes the IT policy. The IT policy module 146 then ensures that the IT policy data is authenticated by the mobile device 100. The IT policy data can then be stored in the flash memory 106 in its native form. After the IT policy data is stored, a global notification can be sent by the IT policy module 146 to all of the applications residing on the mobile device 100. Applications for which the IT policy may be applicable then respond by reading the IT policy data to look for IT policy rules that are applicable.

The IT policy module 146 can include a parser (not shown), which can be used by the applications to read the IT policy rules. In some cases, another module or application can provide the parser. Grouped IT policy rules, described in more detail below, are retrieved as byte streams, which are then sent (recursively, in a sense) into the parser to determine the values of each IT policy rule defined within the grouped IT policy rule. In at least some example embodiments, the IT policy module 146 can determine which applications are affected by the IT policy data and send a notification to only those applications. In either of these cases, for applications that aren't running at the time of the notification, the applications can call the parser or the IT policy module 146 when they are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 146 sends an acknowledgement back to the host system to indicate that the IT policy data was received and successfully applied.

Other types of software applications can also be installed on the mobile device 100. These software applications can be third party applications, which are added after the manufacture of the mobile device 100. Examples of third party applications include games, calculators, utilities, etc.

The additional applications can be loaded onto the mobile device 100 through at least one of the wireless network 200, the auxiliary I/O subsystem 112, the data port 114, the short-range communications subsystem 122, or any other suitable device subsystem 124. This flexibility in application installation increases the functionality of the mobile device 100 and may provide enhanced on-device functions, communication-related functions, or both. For example, secure communication applications may enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

The short-range communications subsystem 122 provides for communication between the mobile device 100 and different systems or devices, without the use of the wireless network 200. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an email message, or web page download will be processed by the communication subsystem 104 and input to the main processor 102. The main processor 102 will then process the received signal for output to the display 110 or alternatively to the auxiliary I/O subsystem 112. A subscriber may also compose data items, such as email messages, for example, using the keyboard 116 in conjunction with the display 110 and possibly the auxiliary I/O subsystem 112. The auxiliary subsystem 112 may include devices such as: a touch screen, mouse, track ball, infrared fingerprint detector, or a roller wheel with dynamic button pressing capability. The keyboard 116 is preferably an alphanumeric keyboard and/or telephone-type keypad. However, other types of keyboards may also be used. A composed item may be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

Figure 3:
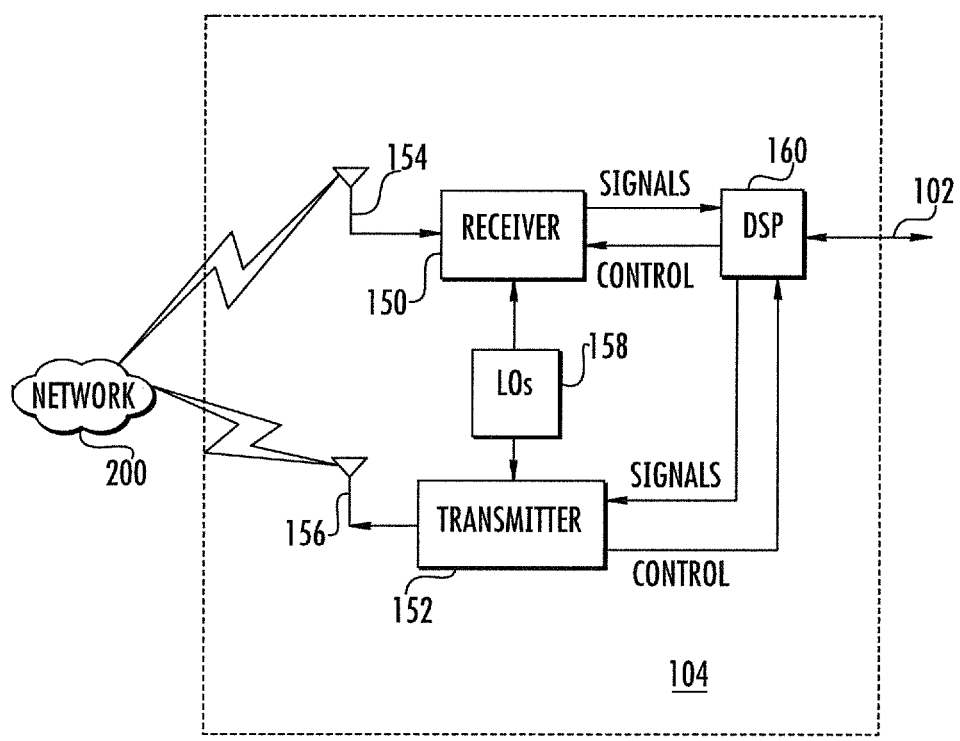
FIG. 3 is a block diagram of an example embodiment of a communication subsystem component of the mobile device of FIG. 2.

Referring now to FIG. 3, an example block diagram of the communication subsystem component 104 is shown. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the mobile device 100 is intended to operate. Thus, it should be understood that the design illustrated in FIG. 3 serves only as one example.

Signals received by the antenna 154 through the wireless network 200 are input to the receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 may be adaptively controlled through automatic gain control algorithms implemented in the DSP 160.

The wireless link between the mobile device 100 and the wireless network 200 can contain one or more different channels, typically different RF channels, and associated protocols used between the mobile device 100 and the wireless network 200. An RF channel is a limited resource that must be conserved, typically due to limits in overall bandwidth and limited battery power of the mobile device 100.

When the mobile device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods.

Figure 4:
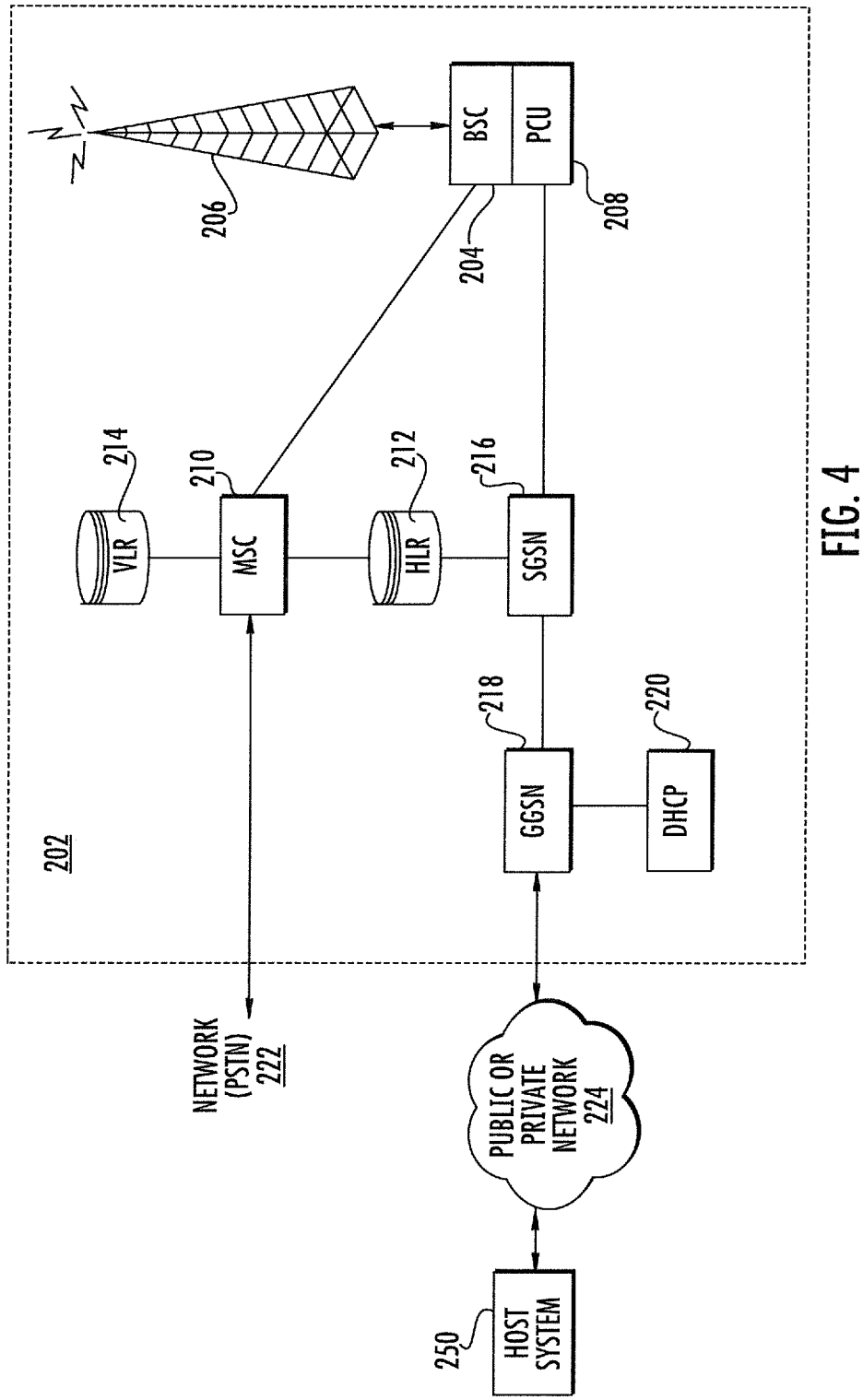
FIG. 4 is an example block diagram of a node of a wireless network.

Referring now to FIG. 4, a block diagram of an example implementation of a node 202 of the wireless network 200 is shown. In practice, the wireless network 200 includes one or more nodes 202. In conjunction with the connect module 144, the mobile device 100 can communicate with the node 202 within the wireless network 200. In the example implementation of FIG. 4, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to a public or private network (Internet) 224 (also referred to herein generally as a shared network infrastructure) represents the data path for GPRS capable mobile devices. In a GSM network extended with GPRS capabilities, the BSC 204 also contains the Packet Control Unit (PCU) 208 that connects to the SGSN 216 to control segmentation, radio channel allocation and to satisfy packet switched requirements. To track the location of the mobile device 100 and availability for both circuit switched and packet switched management, the HLR 212 is shared between the MSC 210 and the SGSN 216. Access to the VLR 214 is controlled by the MSC 210.

The station 206 is a fixed transceiver station and together with the BSC 204 form fixed transceiver equipment. The fixed transceiver equipment provides wireless network coverage for a particular coverage area commonly referred to as a "cell." The fixed transceiver equipment transmits communication signals to and receives communication signals from mobile devices within its cell via the station 206. The fixed transceiver equipment normally performs such functions as modulation and possibly encoding and/or encryption of signals to be transmitted to the mobile device 100 in accordance with particular, usually predetermined, communication protocols and parameters, under control of its controller. The fixed transceiver equipment similarly demodulates and possibly decodes and decrypts, if necessary, any communication signals received from the mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support, namely packet switched data support, within GSM. The SGSN 216 and the MSC 210 have similar responsibilities within the wireless network 200 by keeping track of the location of each mobile device 100. The SGSN 216 also performs security functions and access control for data traffic on the wireless network 200. The GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from a mobile device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com."

Once the GPRS Attach operation is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a mobile device 100 is not using its PDP Context, the POP Context can be de-allocated and the IP address returned to the IP address pool managed by the DHCP server 220.

Figure 5:
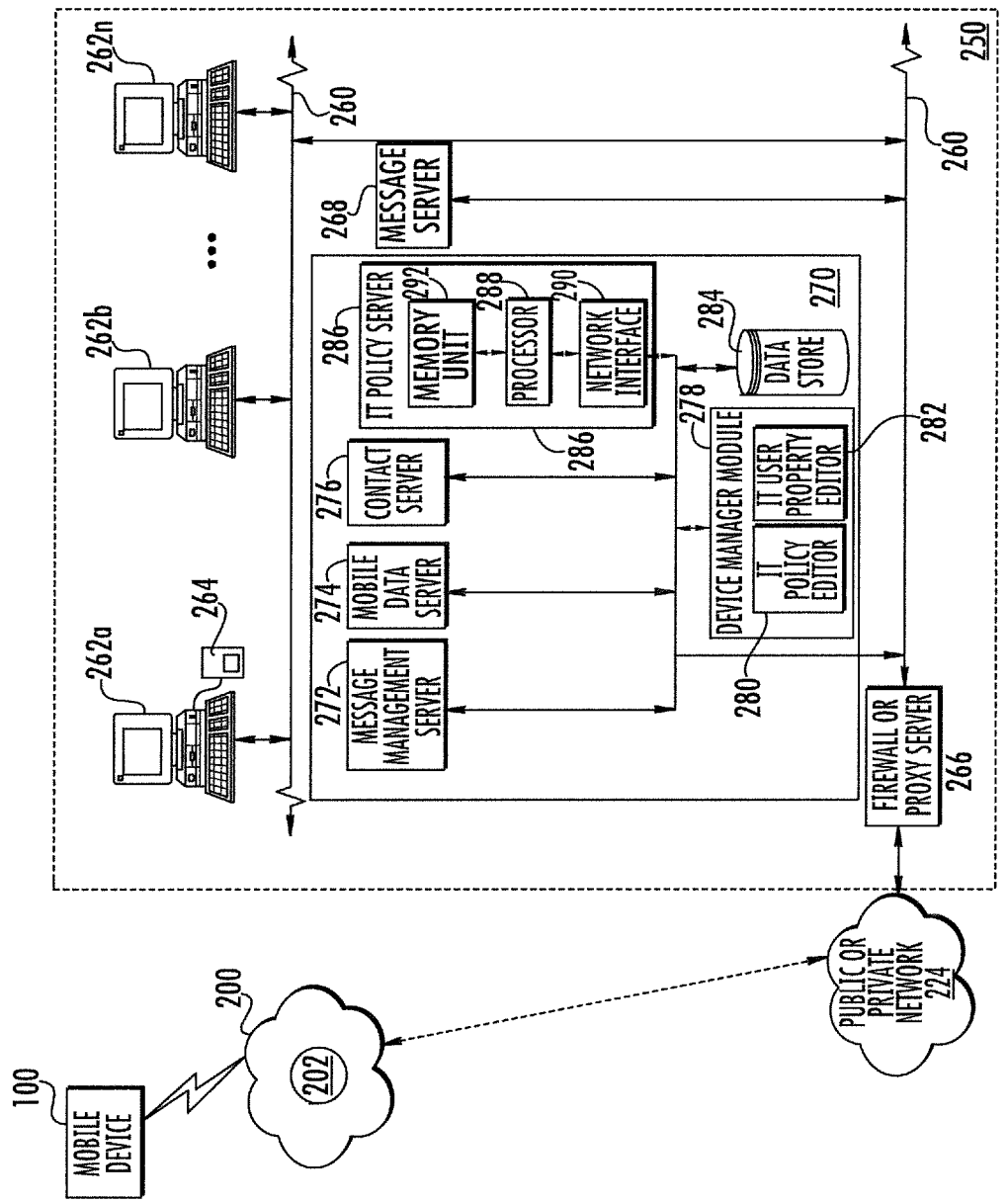
FIG. 5 is a block diagram illustrating components of a host system in one example configuration for use with the wireless network of FIG. 4 and the mobile device of FIG. 2.

Referring now to FIG. 5, shown therein is a block diagram illustrating components of an example configuration of a host system 250 that the mobile device 100 can communicate with in conjunction with the connect module 144. The host system 250 will typically be a corporate enterprise or other local area network (LAN), but may also be a home office computer or some other private system, for example, in variant implementations. In this example shown in FIG. 5, the host system 250 is depicted as a LAN of an organization to which a user of the mobile device 100 belongs. Typically, a plurality of mobile devices can communicate wirelessly with the host system 250 through one or more nodes 202 of the wireless network 200.

The host system 250 includes a number of network components connected to each other by a network 260. For instance, a user's desktop computer 262a with an accompanying cradle 264 for the user's mobile device 100 is situated on a LAN connection. The cradle 264 for the mobile device 100 can be coupled to the computer 262a by a serial or a Universal Serial Bus (USB) connection, for example. Other user computers 262b-262n are also situated on the network 260, and each may or may not be equipped with an accompanying cradle 264. The cradle 264 facilitates the loading of information (e.g., PIM data, private symmetric encryption keys to facilitate secure communications) from the user computer 262a to the mobile device 100, and may be particularly useful for bulk information updates often performed in initializing the mobile device 100 for use. The information downloaded to the mobile device 100 may include certificates used in the exchange of messages.

It will be understood by persons skilled in the art that the user computers 262a-262n will typically also be connected to other peripheral devices, such as printers, etc. which are not explicitly shown in FIG. 5. Furthermore, only a subset of network components of the host system 250 are shown in FIG. 2 for ease of exposition, and it will be understood by persons skilled in the art that the host system 250 will include additional components that are not explicitly shown in FIG. 3 for this example configuration. More generally, the host system 250 may represent a smaller part of a larger network (not shown) of the organization, and may include different components and/or be arranged in different topologies than that shown in the example embodiment of FIG. 5.

To facilitate the operation of the mobile device 100 and the wireless communication of messages and message-related data between the mobile device 100 and components of the host system 250, a number of wireless communication support components 270 can be provided. In some implementations, the wireless communication support components 270 can include a message management server 272, a mobile data server 274, a contact server 276, and a device manager module 278. The device manager module 278 includes an IT Policy editor 280 and an IT user property editor 282, as well as other software components for allowing an IT administrator to configure the mobile devices 100. In an alternative example embodiment, there may be one editor that provides the functionality of both the IT policy editor 280 and the IT user property editor 282. The support components 270 also include a data store 284, and an IT policy server 286. The IT policy server 286 includes a processor 288, a network interface 290 and a memory unit 292. The processor 288 controls the operation of the IT policy server 286 and executes functions related to the standardized IT policy as described below. The network interface 290 allows the IT policy server 286 to communicate with the various components of the host system 250 and the mobile devices 100. The memory unit 292 can store functions used in implementing the IT policy as well as related data. Those skilled in the art know how to implement these various components. Other components may also be included as is well known to those skilled in the art. Further, in some implementations, the data store 284 can be part of any one of the servers.

In this example embodiment, the mobile device 100 communicates with the host system 250 through node 202 of the wireless network 200 and a shared network infrastructure 224 such as a service provider network or the public Internet. Access to the host system 250 may be provided through one or more routers (not shown), and computing devices of the host system 250 may operate from behind a firewall or proxy server 266. The proxy server 266 provides a secure node and a wireless internet gateway for the host system 250. The proxy server 266 intelligently routes data to the correct destination server within the host system 250.

In some implementations, the host system 250 can include a wireless VPN router (not shown) to facilitate data exchange between the host system 250 and the mobile device 100. The wireless VPN router allows a VPN connection to be established directly through a specific wireless network to the mobile device 100. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the mobile device 100 in this alternative implementation.

Messages intended for a user of the mobile device 100 are initially received by a message server 268 of the host system 250. Such messages may originate from any number of sources. For instance, a message may have been sent by a sender from the computer 262b within the host system 250, from a different mobile device (not shown) connected to the wireless network 200 or a different wireless network, or from a different computing device, or other device capable of sending messages, via the shared network infrastructure 224, possibly through an application service provider (ASP) or Internet service provider (ISP), for example.

The message server 268 typically acts as the primary interface for the exchange of messages, particularly email messages, within the organization and over the shared network infrastructure 224. Each user in the organization that has been set up to send and receive messages is typically associated with a user account managed by the message server 268. Some example implementations of the message server 268 include a Microsoft Exchange™ server, a Lotus Domino™ server, a Novell Groupwise™ server, or another suitable mail server installed in a corporate environment. In some implementations, the host system 250 may include multiple message servers 268. The message server 268 may also be adapted to provide additional functions beyond message management, including the management of data associated with calendars and task lists, for example.

When messages are received by the message server 268, they are typically stored in a data store associated with the message server 268. In at least some example embodiments, the data store may be a separate hardware unit, such as data store 284, that the message server 268 communicates with. Messages can be subsequently retrieved and delivered to users by accessing the message server 268. For instance, an email client application operating on a user's computer 262*a* may request the email messages associated with that user's account stored on the data store associated with the message server 268, These messages are then retrieved from the data store and stored locally on the computer 262*a*. The data store associated with the message server 268 can store copies of each message that is locally stored on the mobile device 100. Alternatively, the data store associated with the message server 268 can store all of the messages for the user of the mobile device 100 and only a smaller number of messages can be stored on the mobile device 100 to conserve memory. For instance, the most recent messages (i.e., those received in the past two to three months for example) can be stored on the mobile device 100.

When operating the mobile device 100, the user may wish to have email messages retrieved for delivery to the mobile device 100. The message application 138 operating on the mobile device 100 may also request messages associated with the user's account from the message server 268. The message application 138 may be configured (either by the user or by an administrator, possibly in accordance with an organization's information technology (IT) policy) to make this request at the direction of the user, at some pre-defined time interval, or upon the occurrence of some pre-defined event. In some implementations, the mobile device 100 is assigned its own email address, and messages addressed specifically to the mobile device 100 are automatically redirected to the mobile device 100 as they are received by the message server 268.

The message management server 272 can be used to specifically provide support for the management of messages, such as email messages, that are to be handled by mobile devices. Generally, while messages are still stored on the message server 268, the message management server 272 can be used to control when, if, and how messages are sent to the mobile device 100. The message management server 272 also facilitates the handling of messages composed on the mobile device 100, which are sent to the message server 268 for subsequent delivery.

For example, the message management server 272 may monitor the user's "mailbox" (e.g., the message store associated with the user's account on the message server 268) for new email messages, and apply user-definable filters to new messages to determine if and how the messages are relayed to the user's mobile device 100. The message management server 272 may also compress and encrypt new messages (e.g., using an encryption technique such as Data Encryption Standard (DES), Triple DES, or Advanced Encryption Standard (AES)) and push them to the mobile device 100 via the shared network infrastructure 224 and the wireless network 200. The message management server 272 may also receive messages composed on the mobile device 100 (e.g., encrypted using Triple DES), decrypt and decompress the composed messages, re-format the composed messages if desired so that they will appear to have originated from the user's computer 262*a*, and re-route the composed messages to the message server 268 for delivery.

Certain properties or restrictions associated with messages that are to be sent from and/or received by the mobile device 100 can be defined (e.g., by an administrator in accordance with IT policy) and enforced by the message management server 272. These may include whether the mobile device 100 may receive encrypted and/or signed messages, minimum encryption key sizes, whether outgoing messages must be encrypted and/or signed, and whether copies of all secure messages sent from the mobile device 100 are to be sent to a pre-defined copy address, for example.

The message management server 272 may also be adapted to provide other control functions, such as only pushing certain message information or pre-defined portions (e.g., "blocks") of a message stored on the message server 268 to the mobile device 100. For example, in some cases, when a message is initially retrieved by the mobile device 100 from the message server 268, the message management server 272 may push only the first part of a message to the mobile device 100, with the part being of a pre-defined size (e.g., 2 KB). The user can then request that more of the message be delivered in similar-sized blocks by the message management server 272 to the mobile device 100, possibly up to a maximum predefined message size. Accordingly, the message management server 272 facilitates better control over the type of data and the amount of data that is communicated to the mobile device 100, and can help to minimize potential waste of bandwidth or other resources.

The mobile data server 274 encompasses any other server that stores information that is relevant to the corporation. The mobile data server 274 may include, but is not limited to, databases, online data document repositories, customer relationship management (CRM) systems, or enterprise resource planning (ERP) applications.

The contact server 276 can provide information for a list of contacts for the user in a similar fashion as the address book on the mobile device 100. Accordingly, for a given contact, the contact server 276 can include the name, phone number, work address and email address of the contact, among other information. The contact server 276 can also provide a global address list that contains the contact information for all of the contacts associated with the host system 250.

It will be understood by persons skilled in the art that the message management server 272, the mobile data server 274, the contact server 276, the device manager module 278, the data store 284 and the IT policy server 286 do not need to be implemented on separate physical servers within the host system 250. For example, some or all of the functions associated with the message management server 272 may be integrated with the message server 268, or some other server in the host system 250. Alternatively, the host system 250 may include multiple message management servers 272, particularly in variant implementations where a large number of mobile devices need to be supported.

Alternatively, in some example embodiments, the IT policy server 286 can provide the IT policy editor 280, the IT user property editor 282 and the data store 284. In some cases, the IT policy server 286 can also provide the device manager module 278. The processor 288 of the IT policy server 286 can be used to perform the various steps of a method for providing IT policy data that is customizable on a per-user basis. The processor 288 can execute the editors 280 and 282. In some cases, the functionality of the editors 280 and 282 can be provided by a single editor. In some cases, the memory unit 292 can provide the data store 284.

The device manager module 278 provides an IT administrator with a graphical user interface with which the IT administrator interacts to configure various settings for the mobile devices 100. As mentioned, the IT administrator can use IT policy rules to define behaviors of certain applications on the mobile device 100 that are permitted such as phone, web browser or Instant Messenger use. The IT policy rules can also be used to set specific values for configuration settings that an organization requires on the mobile devices 100 such as auto signature text, WLAN/VoIP/VPN configuration, security requirements (e.g., encryption algorithms, password rules, etc.), specifying themes or applications that are allowed to run on the mobile device 100, and the like.

Figure 8:
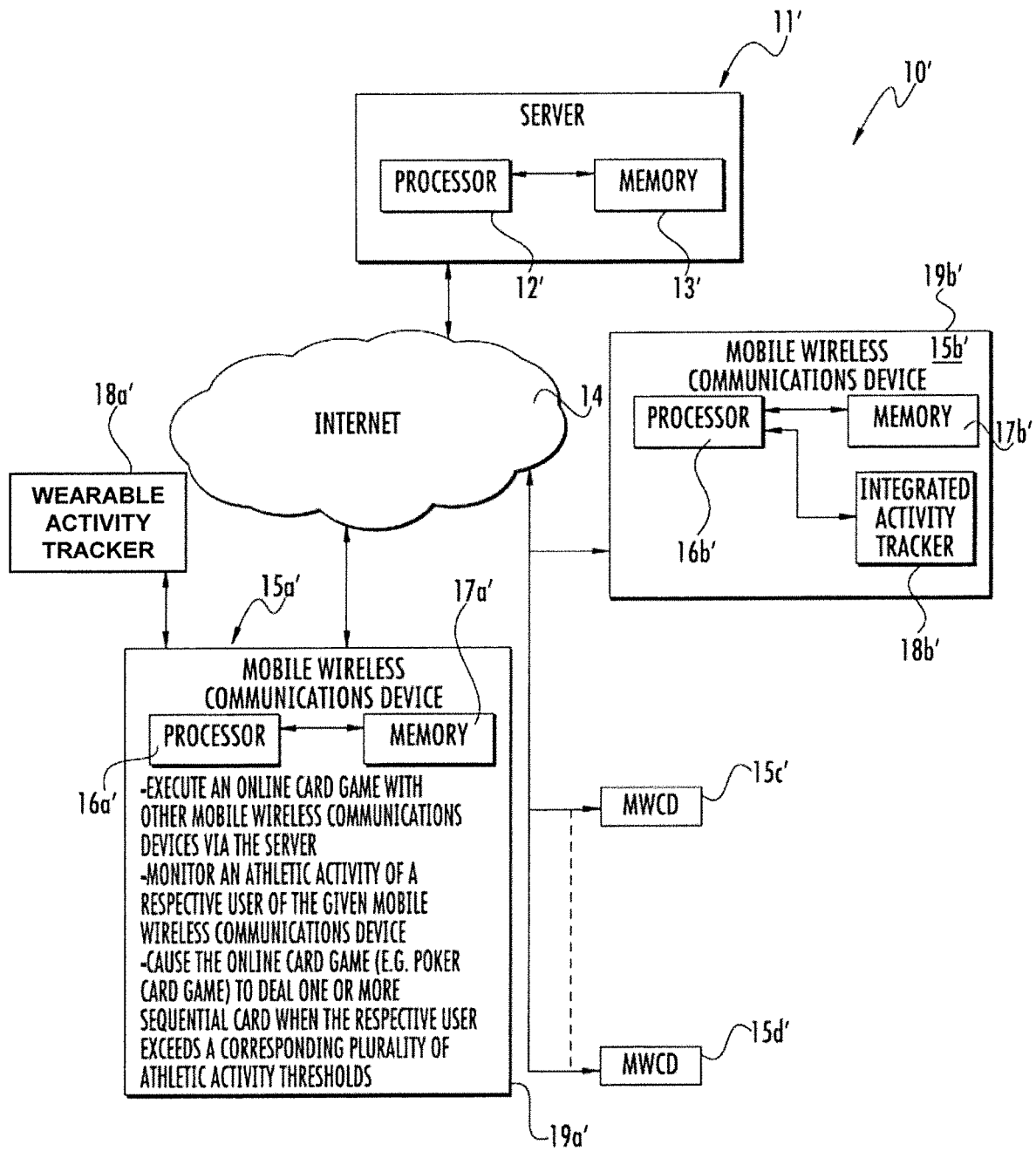
FIG. 8 is a schematic diagram of another embodiment of the communication system, according to the present disclosure.

Referring now additionally to FIG. 8, another embodiment of the communication system 10' is now described. In this embodiment of the communication system 10', those elements already discussed above with respect to FIG. 1 are given prime notation and most require no further discussion herein. This embodiment differs from the previous embodiment in that this communication system 10' illustratively includes a server 11' comprising a memory 13' and processor 12' coupled therewith, and a plurality of mobile wireless communications devices 15a'-15d' in communication with the server. As will be appreciated, the server 11' may comprise a remote computing device in communication with the plurality of mobile wireless communications devices 15a'-15d' over a network 14', such as the Internet. The server 11' may also comprise a virtual server provided via a cloud computing service, such as Amazon Web Services, as available from Amazon.com, Inc., of Seattle, Wash.

Each mobile wireless communications device 15a'-15d' (e.g. cellular phone, tablet computing device, desktop computer) illustratively includes a memory 17a'-17b' and processor 16a'-16b' coupled therewith. For illustrative clarity, only two mobile wireless communications devices 15a'-15b' are depicted in detail, and it should be appreciated that the other mobile wireless communications devices 15c'-15d' may be similarly constituted.

The communication system 10' illustratively includes a given mobile wireless communications device 15a' from the plurality 15a'-15d' thereof, and a given activity tracker device 19a' carried by a respective user of the given mobile wireless communications device. The given mobile wireless communications device 15a' is illustratively configured to execute an online card game with other mobile wireless communications devices 15b'-15d' via the server 11'. In other words, the respective users of the given mobile wireless communications device 15a' and the other mobile wireless communications devices 15b'-15d' are competing in an online multi-player card game (i.e. an online card tournament).

The given mobile wireless communications device 15a' is illustratively configured to wirelessly communicate with the given activity tracker device 18a' for monitoring an athletic activity of the respective user of the given mobile wireless communications device. The given activity tracker device 18a' may comprise a wearable wireless fitness tracker device 18a' separate from the given mobile wireless communications device 15e. For example, the wearable wireless fitness tracker device 18a' may comprise an activity tracker device, such as a Fitbit Smartwatch, as available from Fitbit, Inc. of San Francisco, Calif.

In other embodiments, the mobile wireless communications device 15b' may include a housing 19b' carrying the processor 16b' and memory 17b'. Here, the activity tracker device 18b' may comprise an integrated activity tracker device (e.g. an onboard gyroscope or an accelerometer) carried by the housing 19b'. The athletic activity of the respective user may include at least one of a value of steps, a value of stair steps, a linear distance value, or a set time period (e.g. 5 minutes) where the user's heart rate is greater than a threshold, such as being in the cardio zone, for example. Once the respective user exceeds the value, the user is awarded a set amount of points for the online card game.

In embodiments where the athletic activity is heart rate based, the activity tracker device 18a' would need to include a heat rate monitor device. Also, the point system of the online card game could progressively award more points as the heart rate increases. For example, 5 minutes of moderate heart rate earns 200 points, and 5 minutes of cardio zone heart rate earns 500 points.

The given mobile wireless communications device 15a' is illustratively configured to communicate with the server and cause the online card game to deal at least one card when the respective user exceeds at least one athletic activity threshold or a set value of points. It should be appreciated that the online card game could award cards directly based on the at least one athletic activity threshold, and that the points are simply an easily quantifiable proxy for the at least one athletic activity threshold.

The given mobile wireless communications device 15a' is illustratively configured to communicate with the server 11' and cause the online card game to deal a plurality of sequential cards when the respective user exceeds a corresponding plurality of athletic activity thresholds. In other words, as the respective user performs more athletic activity, the user is dealt more cards.

More specifically, the online card game includes a minimum number of cards, and the server 11' is configured, when the respective user has been dealt a number of cards greater than or equal to the minimum number of cards and when the respective user exceeds a subsequent athletic activity threshold, to deal a new card and permit the respective user to replace an existing card with the new card in the online card game. This permits the respective user to elect a most desired card for the existing hand of cards, thereby further encouraging the respective user to accomplish more athletic activity.

Also, the server 11' is configured to operate the online card game to have a time limit. The server 11' is configured, when the time limit has expired and when the respective user has been dealt a number of cards less than the minimum number of cards, to end the online card game for the respective user (i.e. the user is disqualified and removed from the game). In some embodiments, the game administrator (i.e. the person who set up the online card tournament) may elect that these users with less than the minimum number of dealt cards could be automatically dealt a full hand at the conclusion of the set time period.

Also, the server 11' is configured, when the time limit has expired and when the respective user has been dealt a number of cards greater than or equal to the minimum number of cards, to complete the online card game for the respective user with previously dealt cards. For example, the online card game comprises a poker card game, such as 5-card draw poker, joker poker, high score poker, 1-deck draw poker, 1-deck poker unlimited, and poker unlimited, or another card game, such as Spades, Hearts, etc.

Another aspect is directed to a method of operating an online card game within a communication system 10' comprising a server 11', a plurality of mobile wireless communications devices 15a'-15d' in communication with the server, a given mobile wireless communications device 15a' from the plurality thereof, and a given activity tracker device 18a' carried by a respective user of the given mobile wireless communications device. The method includes operating the server 11' and given mobile wireless communications device 15$a'$ to execute an online card game with other mobile wireless communications devices 15$b'$-15$d'$, and operating the given mobile wireless communications device to wirelessly communicate with the given activity tracker device 18$a'$ for monitoring an athletic activity of the respective user of the given mobile wireless communications device. The method further includes operating the server 11' and given mobile wireless communications device 15$a'$ to cause the online card game to deal at least one card when the respective user exceeds at least one athletic activity threshold.

Another aspect is directed to a method of providing an online card game for a plurality of users communicating over a network 14' (e.g. Internet) within a communication system 10'. The communication system 10' includes a server 11', a plurality of mobile wireless communications devices 15$a'$-15$d'$ associated with the plurality of users, a given mobile wireless communications device 15$a'$ from the plurality thereof, and a given activity tracker device 18$a'$ carried by a respective user of the given mobile wireless communications device. The method includes rendering a gaming interface on each of the plurality of mobile wireless communications devices 15$a'$-15$d'$ for the online card game, and causing the given mobile wireless communications device to wirelessly communicate with the given activity tracker device 18$a'$ for monitoring an athletic activity of the respective user of the given mobile wireless communications device. The method further includes causing the online card game to deal at least one card when the respective user exceeds at least one athletic activity threshold.

Another aspect is directed to a non-transitory computer-readable medium having instructions stored thereon which, when executed by a computer, cause the computer to perform a method of providing an online card game for a plurality of users communicating over a network 14' (e.g. Internet) within a communication system 10'. The communication system 10' includes a server 11', a plurality of mobile wireless communications devices 15$a'$-15$d'$ associated with the plurality of users, a given mobile wireless communications device 15$a'$ from the plurality thereof, and a given activity tracker device 18$a'$ carried by a respective user of the given mobile wireless communications device. The method includes rendering a gaming interface on each of the plurality of mobile wireless communications devices 15$a'$-15$d'$ for the online card game, and causing the given mobile wireless communications device to wirelessly communicate with the given activity tracker device 18$a'$ for monitoring an athletic activity of the respective user of the given mobile wireless communications device. The method further includes causing the online card game to deal at least one card when the respective user exceeds at least one athletic activity threshold.

Referring to FIGS. 6A-7N, another exemplary embodiment of the online poker game is now described. In particular, the logic flow of the online poker game is depicted with a set of wireframes. In this illustrated embodiment, the online poker game requires a smart watch or mobile wireless communications device that has the ability to count steps. It is a poker game that allows the player to challenge other players. Players can invite their friends and play a private tournament. To play the game, the player needs to make 2000 steps to receive a random card. The player needs to make 10,000 steps to complete the five cards (i.e. a complete hand of cards within the poker game). They can continue to walk to receive more cards to get better cards in hand (2,000 steps=1 card). After 24 hour time period, the player with the best cards will win the pot.

Figures 6E, 6F, 6G:
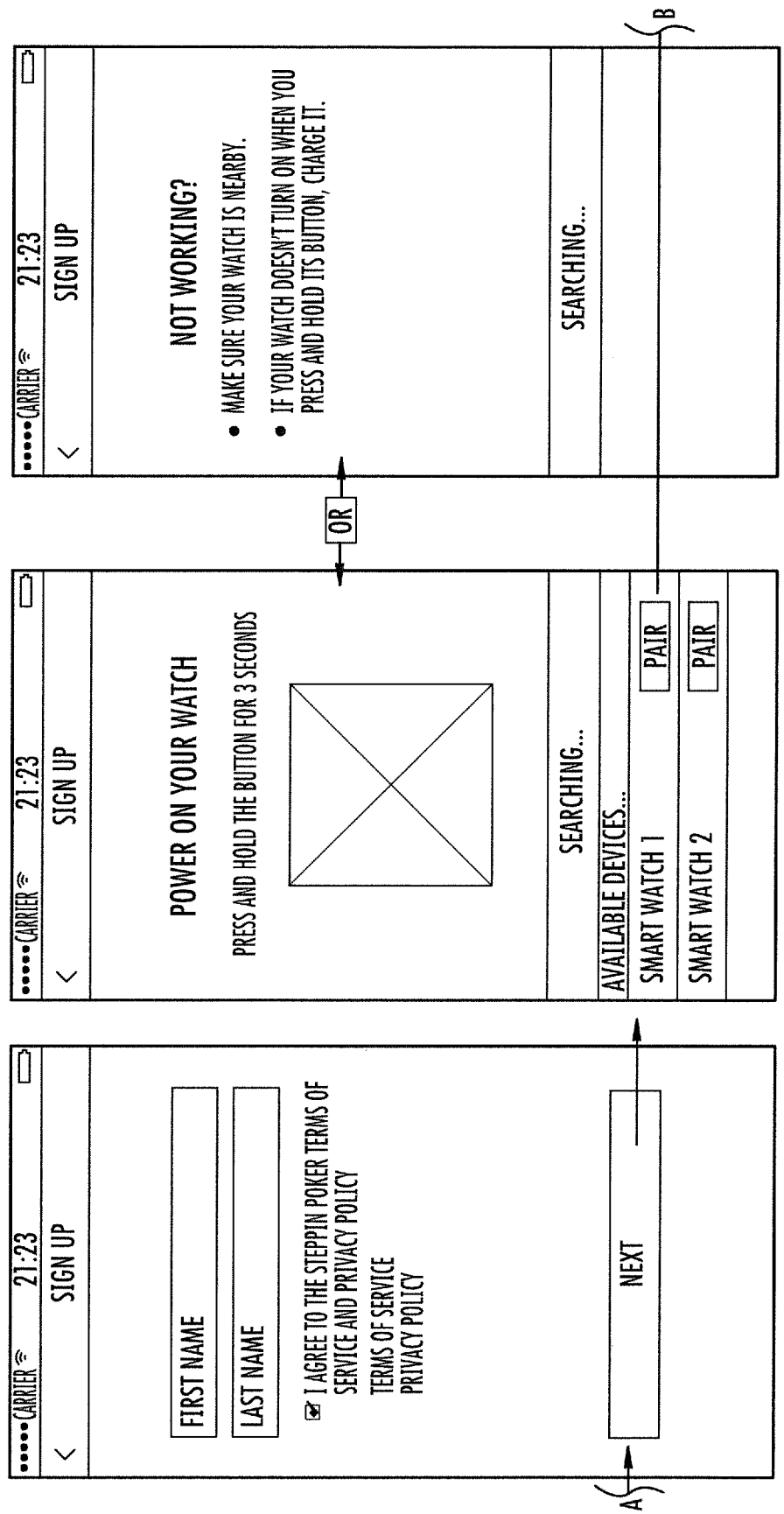
FIGS. 6A-7N are wireframe schematics of logic flow from an online poker game of the wireless communication system of FIG. 1, according to an example embodiment.
Figures 6K, 6L, 6M, 6N:
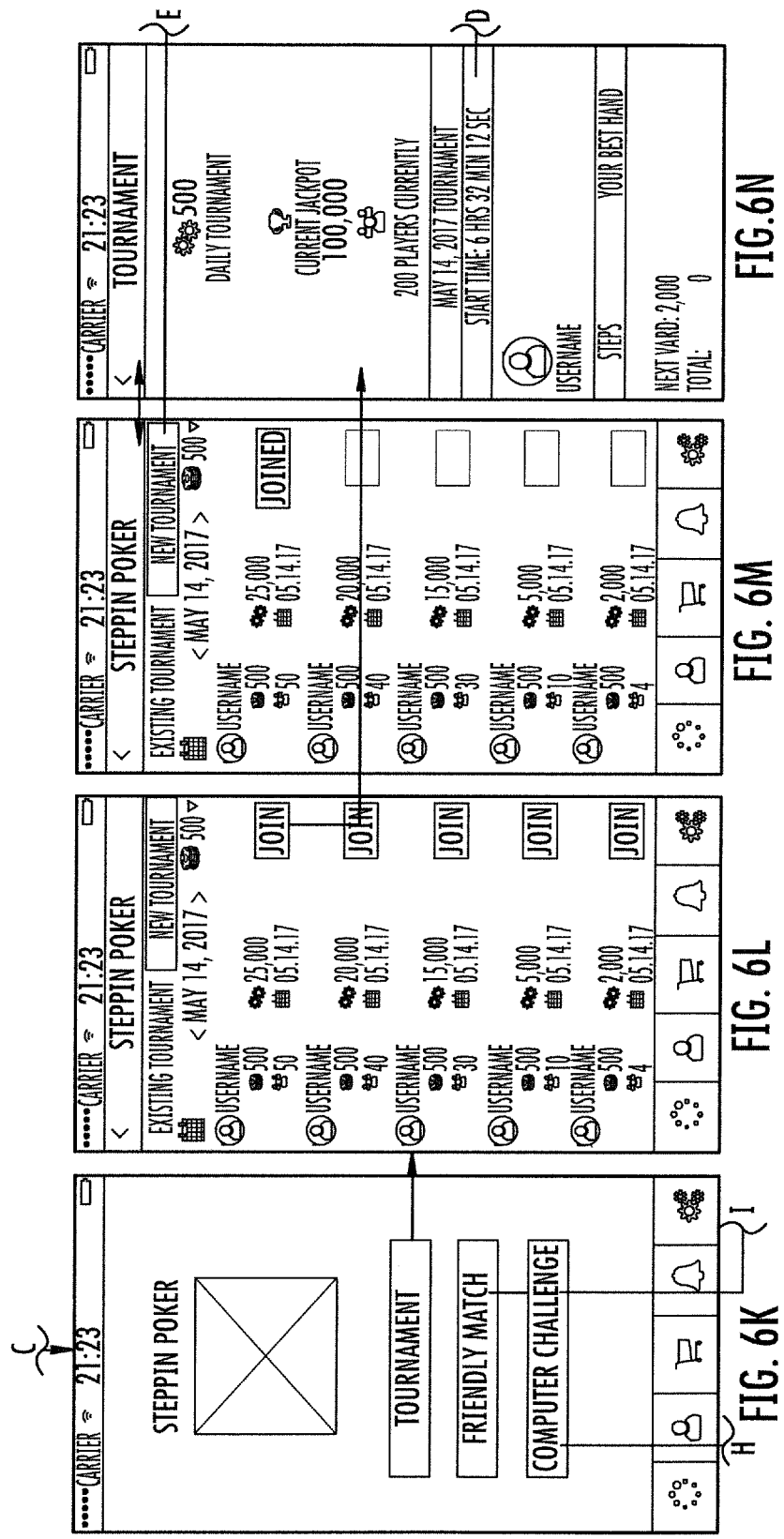

FIGS. 6A-6J relates to user logging in or creating a new account for the online poker game. In FIG. 6A, if the user already has an account, the user may enter the login credentials. The user may also log in using Facebook or Gmail account credentials. If not, the user may create a new account. FIGS. 6F-6G guide the user through the activity tracker pairing process, i.e. an external activity tracker. FIG. 6L shows an interface of the respective user to join existing tournaments. If the user taps the "Join" button, the user will be directed to the next screen. If the user wants to change the tournament date, the user may tap forward/back arrow icon or tap the calendar icon. If the user wants to change the black chips required, the user may tap the down arrow icon and will be given an option of 500, 1000, or 5000. FIG. 6M provides an interface where if the user has already joined a tournament, the user will not be able to join another tournament. The "Join" button of the other tournaments will be grayed out once the user already joined a tournament. FIG. 6N provides an interface where the user can join the tournament as long it hasn't started yet. The jackpot price will increase as more players join.

FIGS. 62-6Q provide an interface where the user will get a random card every 2,000 steps completed. The user will need to get 5 cards to avoid disqualification (i.e. the fifth user). FIGS. 6R-6S provide an interface where the user can create a tournament. The user may select the required black chips (e.g. 500, 1,000, or 5,000). If the user taps the date, the user will be able to change the date of the tournament. The user may slide up/down to change the date.

FIGS. 6U-6V provide an interface where the user can create a friendly match. FIG. 6W provides an interface where the user can access a corresponding Facebook account to invite connected users on the social media network. FIGS. 6Z-7A provide an interface where the user can receive a wildcard. If the user taps the "Wildcard" icon, the interface will show the best cards the user could use (i.e. an optimum hand). The user may tap the selected card to accept or choose a different card. If the user chooses a different card, the interface will show all the remaining cards in the user's deck and will allow the user to choose the card desired. Once the user selects a card, the user will not be able to change. Wildcards can only be used in friendly games and computer challenge games.

Figures 7B, 7C, 7D:
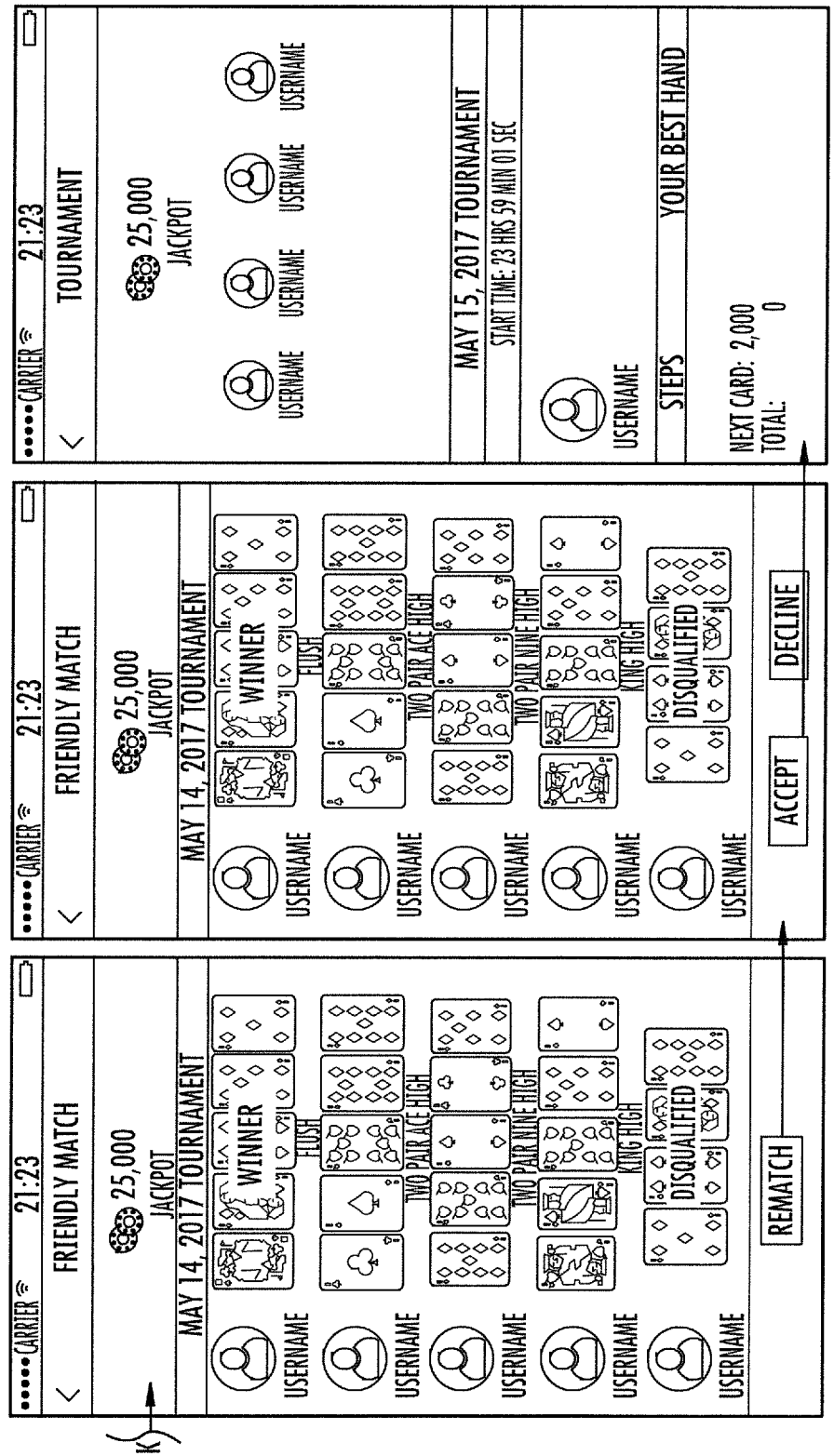
Figures 7I, 7J, 7K:
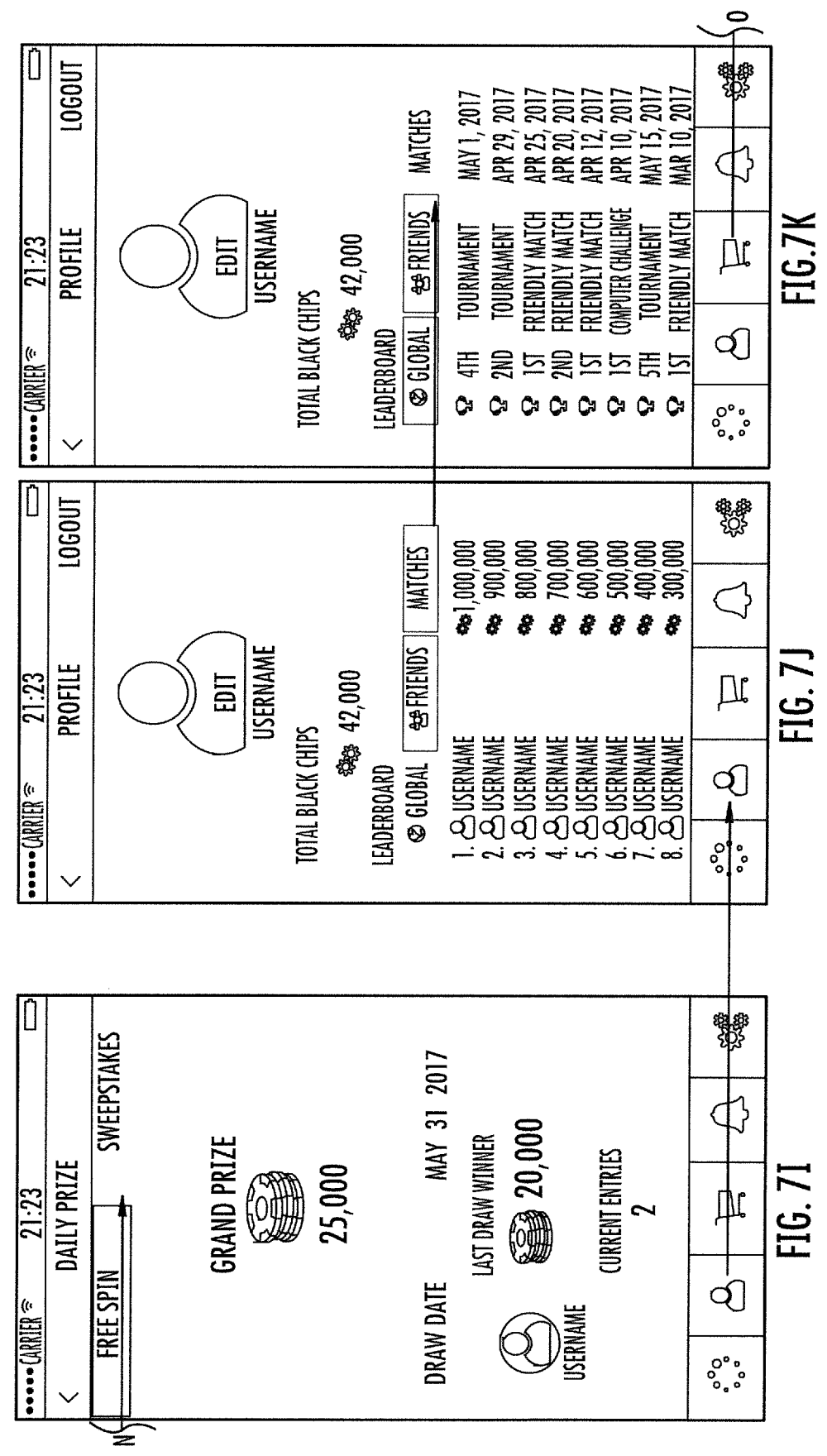
Figure 7N:
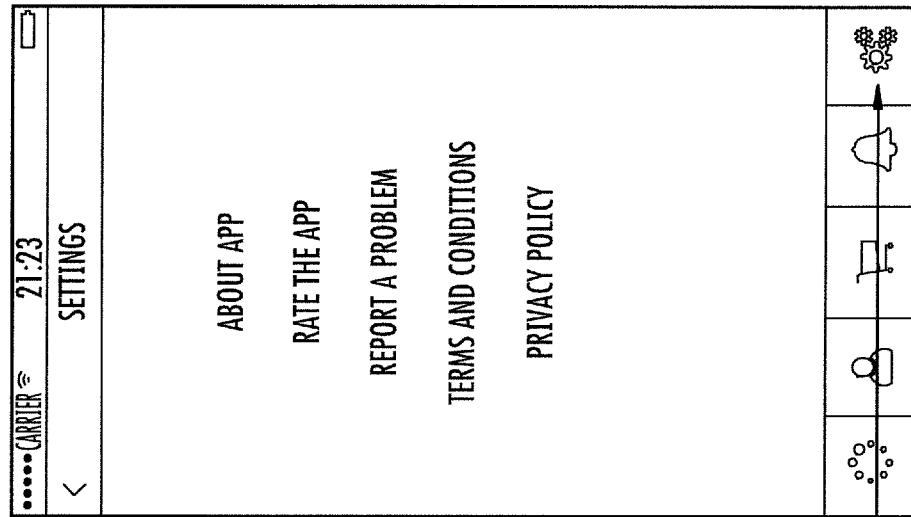
Figure 7M:
Figure 7L:
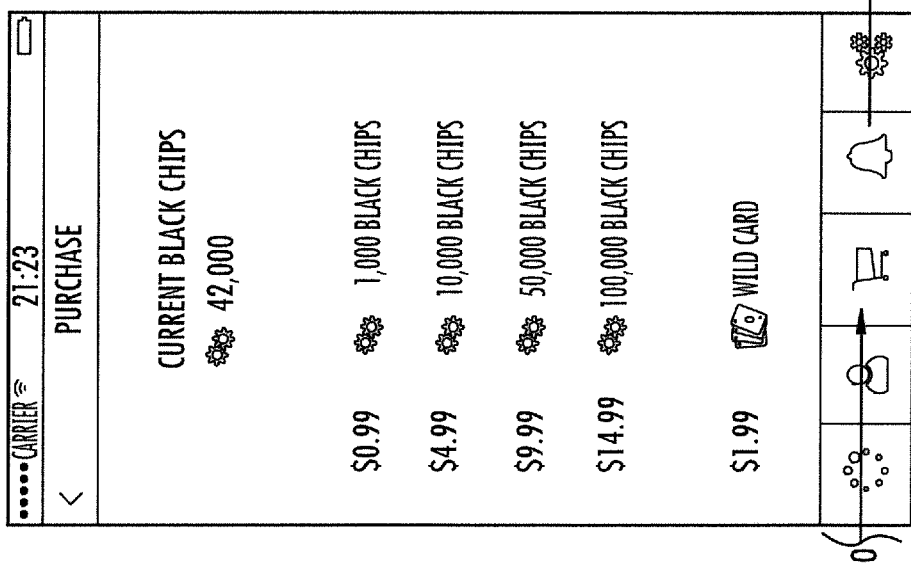

FIGS. 7B-7O provide an interface where the user can elect for a rematch. FIGS. 7E-7G provide an interface where the user can elect for a computer opponent match. FIGS. 7H-7N provide an interface where the user can view a daily price, and adjust profile/settings within the online poker game.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:
1. A communication system comprising:
   a server comprising a memory and processor coupled therewith;
   a plurality of mobile wireless communications devices in communication with said server, each mobile wireless communications device comprising a memory and processor coupled therewith;
   a given mobile wireless communications device from said plurality thereof; and a given activity tracker device carried by a respective user of said given mobile wireless communications device;

said given mobile wireless communications device configured to execute an online card game with at least one other mobile wireless communications device via said server, the online card game including a minimum number of cards, wirelessly communicate with said given activity tracker device for monitoring an athletic activity of the respective user of the given mobile wireless communications device, and communicate with said server and cause the online card game to deal a plurality of sequential cards when the respective user exceeds a corresponding plurality of athletic activity thresholds;

said server is configured to when the respective user has been dealt a number of cards greater than or equal to the minimum number of cards and when the respective user exceeds a subsequent athletic activity threshold, to deal a new card and permit the respective user to replace an existing card with the new card in the online card game, and permit the respective user to elect a most desired card for an existing hand of cards.

2. The communication system of claim 1 wherein said given activity tracker device comprises a wearable wireless fitness tracker device separate from said given mobile wireless communications device; and wherein the athletic activity of the respective user comprises at least one of a value of steps, a value of stair steps, and a linear distance value.

3. The communication system of claim 1 wherein said given mobile wireless communications device comprises a housing, a processor carried by said housing, and a memory coupled to said processor and also carried by said housing; and wherein said given activity tracker device comprises an integrated activity tracker device coupled to said processor and carried by said housing.

4. The communication system of claim 1 wherein said server is configured to operate the online card game to have a time limit.

5. The communication system of claim 4 wherein said server is configured, when the time limit has expired and when the respective user has been dealt a number of cards less than the minimum number of cards, to end the online card game for the respective user.

6. The communication system of claim 4 wherein said server is configured, when the time limit has expired and when the respective user has been dealt a number of cards greater than or equal to the minimum number of cards, to complete the online card game for the respective user with previously dealt cards.

7. The communication system of claim 1 wherein said online card game comprises a poker card game.

8. The communication system of claim 7 wherein said poker card game comprises one of 5-card draw poker, joker poker, high score poker, 1-deck draw poker, 1-deck poker unlimited, and poker unlimited.

9. A method of operating an online card game within a communication system comprising a server, a plurality of mobile wireless communications devices in communication with the server, a given mobile wireless communications device from the plurality thereof, and a given activity tracker device carried by a respective user of the given mobile wireless communications device, the method comprising:

operating the server and given mobile wireless communications device to execute an online card game with at least one other mobile wireless communications device, the online card game including a minimum number of cards;

operating the given mobile wireless communications device to wirelessly communicate with the given activity tracker device for monitoring an athletic activity of the respective user of the given mobile wireless communications device;

operating the server and the given mobile wireless communications device to cause the online card game to deal a plurality of sequential cards when the respective user exceeds a corresponding plurality of athletic activity thresholds; and operating the server and the given mobile wireless communications device to when the respective user has been dealt a number of cards greater than or equal to the minimum number of cards and when the respective user exceeds a subsequent athletic activity threshold, to deal a new card and permit the respective user to replace an existing card with the new card in the online card game, and permit the respective user to elect a most desired card for an existing hand of cards.

10. The method of claim 9 wherein the given activity tracker device comprises a wearable wireless fitness tracker device separate from the given mobile wireless communications device; and wherein the athletic activity of the respective user comprises at least one of a value of steps, a value of stair steps, and a linear distance value.

11. The method of claim 9 wherein the given activity tracker device comprises an integrated activity tracker device carried by a housing of the given mobile wireless communications device.

12. The method of claim 9 further comprising operating the server to operate the online card game to have a time limit.

13. The method of claim 12 further comprising operating the server, when the time limit has expired and when the respective user has been dealt a number of cards less than the minimum number of cards, to end the online card game for the respective user.

14. The method of claim 12 further comprising operating the server, when the time limit has expired and when the respective user has been dealt a number of cards greater than or equal to the minimum number of cards, to complete the online card game for the respective user with previously dealt cards.

15. The method of claim 9 wherein the online card game comprises a poker card game.

16. The method of claim 15 wherein the poker card game comprises one of 5-card draw poker, joker poker, high score poker, 1-deck draw poker, 1-deck poker unlimited, and poker unlimited.

* * * * *